US012577122B2

(12) United States Patent
Slimani et al.

(10) Patent No.: US 12,577,122 B2
(45) Date of Patent: Mar. 17, 2026

(54) SUPERCONDUCTING MATERIAL AND METHOD OF PREPARATION THEREOF

(71) Applicant: Imam Abdulrahman Bin Faisal University, Dammam (SA)

(72) Inventors: Yassine Slimani, Dammam (SA); Sarah Awwadh Alotaibi, Dammam (SA); Munirah Abdullah Almessiere, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 866 days.

(21) Appl. No.: 17/882,139

(22) Filed: Aug. 5, 2022

(65) Prior Publication Data

US 2024/0043280 A1 Feb. 8, 2024

(51) Int. Cl.
| | |
|---|---|
| *C01F 17/32* | (2020.01) |
| *B82Y 30/00* | (2011.01) |
| *C01F 1/00* | (2006.01) |
| *C01G 41/02* | (2006.01) |
| *H01B 12/02* | (2006.01) |

(52) U.S. Cl.
CPC .............. *C01F 17/32* (2020.01); *B82Y 30/00* (2013.01); *C01F 1/00* (2013.01); *C01G 41/02* (2013.01); *H01B 12/02* (2013.01)

(58) Field of Classification Search
CPC .................................. C01F 17/32; C01F 1/00
See application file for complete search history.

(56) References Cited

U.S. PATENT DOCUMENTS

| | | | | |
|---|---|---|---|---|
| 5,071,827 | A | * | 12/1991 | Lafon .................... C01G 3/006 505/780 |
| 7,919,435 | B2 | | 4/2011 | Goyal |
| 11,107,967 | B2 | | 8/2021 | Slimani et al. |

(Continued)

FOREIGN PATENT DOCUMENTS

| | | |
|---|---|---|
| CN | 105386020 B | 12/2017 |

OTHER PUBLICATIONS

Slimani, et al. ; Excess conductivity investigations of WO3 nanowires added to YBa2Cu3O7-d superconductor ; Journal of Materials Science: Materials in Electronics, vol. 31 ; pp. 3023-3034 ; 2020 ; Abstract Only ; 1 Page.

(Continued)

*Primary Examiner* — Paul A Wartalowicz

(74) *Attorney, Agent, or Firm* — Oblon, McClelland, Maier & Neustadt, L.L.P.

(57) ABSTRACT

A superconducting material is described. The superconducting material includes a rare-earth barium copper oxide (ReBCO) matrix, 0.01 to 0.5 weight percentage (wt. %), $WO_3$ nanoparticles, based on the total weight of superconducting material, and 0.01 to 0.5 wt. % barium titanate nanoparticles, based on the total weight of superconducting material. A method of making superconducting material is also described. The method includes mixing $WO_3$ nanoparticles, barium titanate nanoparticles, and ReBCO particles to form a particulate mixture; pressing the particulate mixture at a pressure of 500 to 1000 megapascals (MPa) to form a solid sample; and heating the solid sample at 800 to 1100 degrees centigrade (° C.) for 1 to 24 hours to form the superconducting material.

19 Claims, 30 Drawing Sheets

(56)                    References Cited

U.S. PATENT DOCUMENTS

| | | | | |
|---|---|---|---|---|
| 11,770,983 | B2 * | 9/2023 | Slimani ............. | H10N 60/0268 |
| 12,069,968 | B2 * | 8/2024 | Slimani ............... | H10N 60/203 |
| 12,089,510 | B2 * | 9/2024 | Slimani ............... | H10N 60/857 |
| 12,144,266 | B1 * | 11/2024 | Slimani ............. | H10N 60/0268 |
| 2002/0198109 | A1 * | 12/2002 | Wu ................... | H10N 60/0801 |
| | | | | 505/100 |
| 2006/0057420 | A1 * | 3/2006 | Yokota .................. | H05K 1/162 |
| | | | | 204/192.15 |
| 2010/0135937 | A1 | 6/2010 | O'Brien et al. | |
| 2016/0172080 | A1 * | 6/2016 | Selvamanickam .. | H10N 60/203 |
| | | | | 252/512 |
| 2018/0087164 | A1 | 3/2018 | Finke et al. | |
| 2020/0119252 | A1 * | 4/2020 | Slimani ............... | H10N 60/857 |

OTHER PUBLICATIONS

Vijayakumar, et al. ; Development of YBa2Cu3O7-δ superconducting thick film on Ba2SmSbO6 substrate material synthesised by combustion technique ; Journal of Experimental Nanoscience, 2014, vol. 9, No. 5 ; Jul. 4, 2012 ; 9 Pages.

* cited by examiner

100

| Mix WO$_3$ nanoparticles, barium titanate nanoparticles, and ReBCO particles to form particulate mixture | 102 |

↓

| Press the particulate mixture at a pressure of 500 to 1000 Mpa to form a solid sample | 104 |

↓

| Heat the solid sample at 800 to 1100 °C for 1 to 24 hours to form the superconducting material | 106 |

| Atomic % / Spectrum | O | Y | Ba | Cu | W | Ti |
|---|---|---|---|---|---|---|
| Spectrum 1 | 58.34 | 6.85 | 14.41 | 20.67 | 0.00 | 0.00 |
| Spectrum 2 | 59.50 | 2.96 | 14.83 | 19.10 | 2.62 | 0.99 |
| Spectrum 3 | 48.18 | 4.19 | 15.18 | 29.78 | 0.15 | 1.51 |

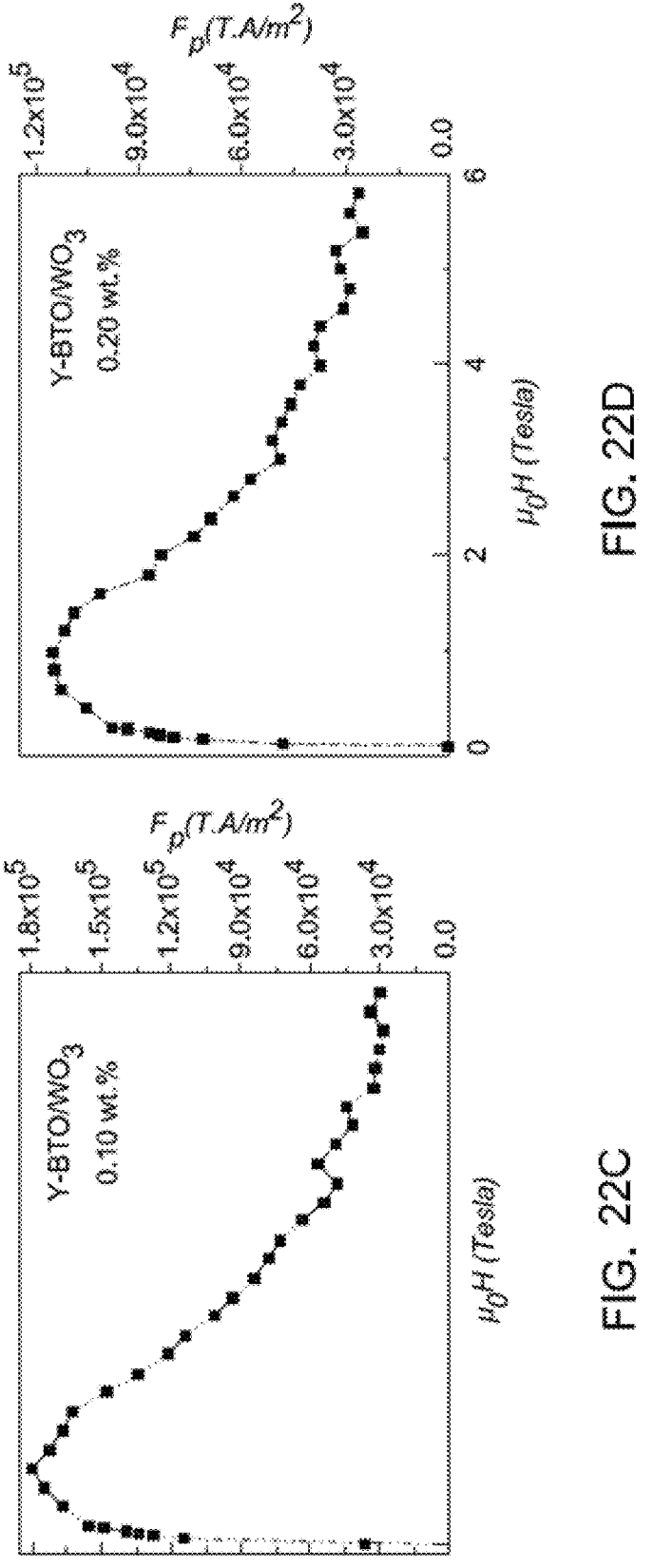

SUPERCONDUCTING MATERIAL AND METHOD OF PREPARATION THEREOF

STATEMENT OF PRIOR DISCLOSURE BY THE INVENTORS

Aspects of the present disclosure are described in the articles "Intergranular properties of polycrystalline $YBa_2Cu_3O_{7-\delta}$ superconductor added with nanoparticles of $WO_3$ and $BaTiO_3$ as artificial pinning centers" published in Ceramics International, 2021, 47, 34260-34268, available on Aug. 30, 2021 and "Superconducting properties of YBCO bulk co-embedded by nano-$BaTiO_3$ and $WO_3$ particles" published in The European Physical Journal Plus, 2022, 137, 46, available Dec. 21, 2021, each of which is incorporated herein by reference in its entirety.

BACKGROUND

Technical Field

The present disclosure is directed to a superconductor, particularly to the superconducting material with YBCO bulk co-embedded by nano-$BaTiO_3$ and $WO_3$ particles and the method of preparation thereof.

DESCRIPTION OF RELATED ART

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Growing energy demands and exhaustion of fossil fuels plus global warming necessitate the development of energy-saving technology for energy conversion and electrical power delivery. High-temperature superconductors (HTS) are designed to update electrical engineering due to their unique energy performance (two times higher than normal conductors) and reasonable economics of working at liquid nitrogen temperatures.

Among the various HTSs developed, a $YBa_2Cu_3O_{7-\delta}$ (YBCO) compound is the most used. The YBCO compound displays a critical temperature transition that can reach up to 94 K and exceeds the temperature of liquid nitrogen (T=77 K), making it desirable for practical application needs. However, the polycrystalline YBCO consists of clusters of grains weakly coupled with the Josephson junctions. The Josephson junctions impair the value of critical current density when an external magnetic field is applied. This greatly restricts its availability in various implementations. Therefore, there is an unmet need for improving YBCO's critical current density and pinning properties.

It is therefore one object of the present disclosure to provide a superconducting material which overcomes the limitations discussed above.

SUMMARY

The present disclosure relates to a superconducting material. The superconducting material includes a rare-earth barium copper oxide (ReBCO) matrix and 0.01 to 0.5 weight percentage (wt. %), tungsten trioxide ($WO_3$) nanoparticles, based on the total weight of superconducting material and 0.01 to 0.5 wt. % barium titanate ($BaTiO_3$/BTO) nanoparticles, based on the total weight of superconducting material.

In some embodiments, the ReBCO matrix is a yttrium barium copper oxide (YBCO) matrix.

In some embodiments, the YBCO matrix includes $YBa_2Cu_3O_{7-\delta}$.

In some embodiments, the $WO_3$ nanoparticles have a mean particle size of 25 to 500 nanometers (nm).

In some embodiments, the barium titanate nanoparticles include cubic barium titanate.

In some embodiments, the barium titanate nanoparticles have a mean particle size of 10 to 250 nm.

In some embodiments, the ReBCO matrix exists in the form of grains having a mean grain size of 1 to 25 micrometers ($\mu$m) by scanning electron microscope (SEM).

In some embodiments, the ReBCO matrix has a mean crystallite size of 25 to 75 nm by powder X-ray diffraction (PXRD).

In some embodiments, the $WO_3$ nanoparticles and barium titanate nanoparticles are disposed within voids between grain boundaries of the ReBCO matrix.

In some embodiments, the superconducting material has an orthorhombicity factor of $5.0 \times 10^{-3}$ to $10.0 \times 10^{-3}$ by PXRD.

In some embodiments, the superconducting material has a superconducting transition temperature of 65 to 90 Kelvin (K).

In some embodiments, the superconducting material has a critical current density at zero applied magnetic field ($J_c(0)$) of $0.01 \times 10^4$ to $0.50 \times 10^4$ ampere per square centimeters ($A \cdot cm^{-2}$).

In some embodiments, the superconducting material has a room temperature resistivity $\rho_n$ of $0.05 \times 10^{-2}$ to $1.75 \times 10^{-2}$ Ohm centimeter ($\Omega \cdot cm$).

The present disclosure also relates to a method of forming the superconducting material. The method includes mixing $WO_3$ nanoparticles, barium titanate nanoparticles, and ReBCO particles to form a particulate mixture, pressing the particulate mixture at a pressure of 500 to 1000 megapascals (MPa) to form a solid sample, and heating the solid sample at 800 to 1100 degrees centigrade (° C.) for 1 to 24 hours to form the superconducting material.

In some embodiments, the method includes the ReBCO particles which are YBCO particles.

In some embodiments, the YBCO particles include $YBa_2Cu_3O_{7-\delta}$.

In some embodiments, the method includes the ReBCO particles that are prepared by calcining a precursor mixture comprising rare earth oxide particles, barium carbonate particles, and copper oxide particles at 800 to 1100° C. for 1 to 24 hours.

In some embodiments, the method includes the ReBCO particles that are YBCO particles and the rare earth oxide is yttrium oxide.

In some embodiments, the barium titanate nanoparticles may include cubic barium titanate.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 22A-22D illustrate the plots of a pinning force density $F_p$ versus applied field for different sintered samples, according to certain embodiments.

DETAILED DESCRIPTION

Figure 1:
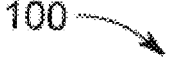
FIG. 1 is a schematic flow diagram of a method for forming a superconducting material, according to certain embodiments.
Figure 1:
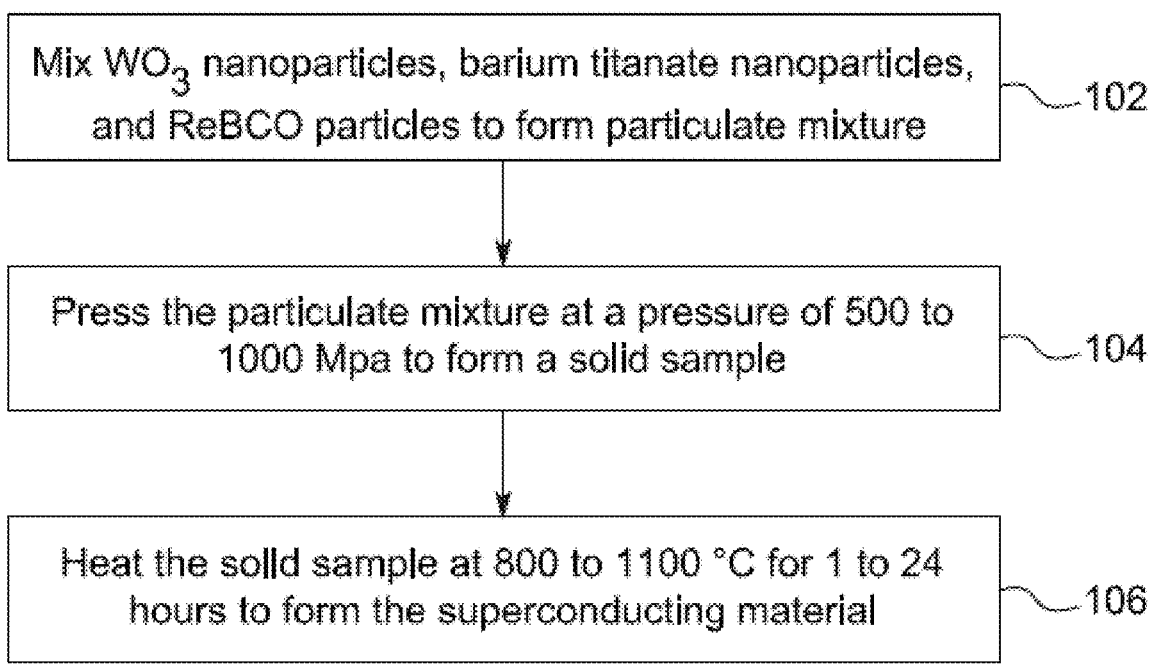

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "superconducting" refers to physical properties observed in certain materials where electrical resistance vanishes, and magnetic flux fields are expelled from the material.

According to a first aspect, the present disclosure relates to a superconducting material. The superconducting material includes a rare-earth barium copper oxide (ReBCO) matrix and 0.01 to 0.5 weight percentage (wt. %), preferably 0.02 to 0.4 wt. %, preferably 0.03 to 0.3 wt. %, preferably 0.04 to 0.25 wt. %, preferably 0.05 to 0.2 wt. % tungsten trioxide ($WO_3$) nanoparticles, based on a total weight of superconducting material and 0.01 to 0.5 wt. %, preferably 0.02 to 0.4 wt. %, preferably 0.03 to 0.3 wt. %, preferably 0.04 to 0.25 wt. %, preferably 0.05 to 0.2 wt. % barium titanate ($BaTiO_3$/ BTO) nanoparticles, based on a total weight of superconducting material. In some embodiments, an amount of barium titanate nanoparticles by mass is equal to an amount of $WO_3$ nanoparticles by mass. In some embodiments, an amount of barium titanate nanoparticles by mass is greater than an amount of $WO_3$ nanoparticles by mass. In some embodiments, an amount of barium titanate nanoparticles by mass is less than an amount of $WO_3$ nanoparticles by mass.

Rare-earth barium copper oxides (ReBCOs) are a class of materials that contain copper oxide, barium ions, and rare-earth ions. These materials typically contain layers of copper oxide which are separated by the barium and rare-earth ions. Such separation can include distinct layers of barium ions and layers of rare-earth ions or layers of mixed barium and rare-earth ions. ReBCOs typically crystallize in defect perovskite crystal structures. The normal perovskite crystal structure is a structure adopted by materials that have the general formula $ABX_3$, where A and B are cations that have a ratio of charge on cation A to charge on cation B of 1:2 and X is an anion. Typical ion charge combinations are $A^+B^{2+}X^-_3$ and $A^{2+}B^{4+}X^{2-}_3$. The perovskite structure type is characterized by the presence of octahedral coordination of the B cation by X anions. These octahedra are arranged in a cubic lattice and are vertex-sharing. The A cations occupy pockets with cubic symmetry defined by 8 of the octahedra. Typically, the arrangement of the octahedra and A cations forms a material with cubic symmetry, however, distortions may lower the symmetry of the material, for example to tetragonal or orthorhombic. Examples of such distortions include shifts of the B cations such that they are not in the center of the octahedra (off-centering), tilting of the octahedra such that the center of the octahedra remain in a cubic arrangement, but the orientation of the octahedra results in a non-cubic symmetry, and the inclusion of other cations which serve to separate the material into distinct layers such as in the ReBCO matrix herein.

In general, the rare earth ions may be any suitable rare earth ion or mixture of rare earth ions. That is, the rare earth ions are at least one selected from the group consisting of yttrium, lanthanum, cerium, praseodymium, neodymium, promethium, samarium, europium, gadolinium, terbium, dysprosium, holmium, erbium, thulium, ytterbium, and lutetium. In some embodiments, the rare earth ions comprise yttrium. In some embodiments, the ReBCO matrix is a yttrium barium copper oxide (YBCO) matrix. In some embodiments, the yttrium barium copper oxide (YBCO) matrix is substantially free of other rare earth ions. In some embodiments, yttrium barium copper oxide (YBCO) matrix is devoid of other rare earth ions.

ReBCOs can have or be composed of one or more distinct phases. Such phases can be characterized by the ratio of the cations (i.e. Re:Ba:Cu) present. In some embodiments, the ReBCO comprises at least one selected from the group consisting of $ReBa_2Cu_3O_{7-\delta}$, $ReBa_2Cu_4O_{8-\delta}$, and $Re_2Ba_4Cu_7O_{15-\delta}$. In some embodiments, the ReBCO is YBCO and the YBCO matrix comprises at least one selected from the group consisting of $YBa_2Cu_3O_{7-\delta}$ (also referred to as Y123), $YBa_2Cu_4O_{8-\delta}$ (also referred to as Y124), and $Y_2Ba_2Cu_7O_{15-\delta}$ (also referred to as Y247). In some embodiments, the YBCO matrix includes $YBa_2Cu_3O_{7-\delta}$. In some embodiments, the YBCO matrix is substantially free of $YBa_2Cu_4O_{8-\delta}$. In some embodiments, the YBCO matrix is substantially free of $Y_2Ba_4Cu_7O_{15-\delta}$. In some embodiments, the YBCO matrix is substantially free of $YBa_2Cu_4O_{8-\delta}$ and $Y_2Ba_4Cu_7O_{15-\delta}$.

The superconducting material also contains $WO_3$ nanoparticles. The $WO_3$ nanoparticles can be dispersed within the ReBCO matrix described above. In general, the $WO_3$ nanoparticles can be any shape known to one of ordinary skill in the art. Examples of suitable shapes the $WO_3$ nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For $WO_3$ nanoparticles of the current invention, nanorods should have an aspect ratio less than 1000, preferably less than 750, preferably less than 500, preferably less than 250, preferably less than 100, preferably less than 75, preferably less than 50, preferably less than 25.

In some embodiments, the $WO_3$ nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of $WO_3$ nanoparticles having a different shape. As used herein, the term "non-uniform shape" refers to an average consistent shape that differs by more than 10% of the distribution of $WO_3$ nanoparticles having a different shape. In one embodiment, the shape is uniform and at least 90% of the $WO_3$ nanoparticles are spherical or substantially circular, and less than 10% are polygonal. In another embodiment, the shape is non-uniform and less than 90% of the $WO_3$ nanoparticles are spherical or substantially circular, and greater than 10% are polygonal.

In some embodiments, the $WO_3$ nanoparticles have a mean particle size of 25 to 500 nm, preferably, 30 to 450 nm, preferably 35 to 400 nm, preferably 40 to 375 nm, preferably 45 to 350 nm, preferably 50 to 325 nm, preferably 55 to 300 nm, preferably 60 to 275 nm, preferably 65 to 250 nm, preferably 70 to 225 nm, preferably 75 to 200 nm, preferably 80 to 175 nm, preferably 90 to 150 nm, preferably 95 to 125 nm, preferably 100 nm. In embodiments where the $WO_3$ nanoparticles are spherical, the particle size may refer to a particle diameter. In embodiments where the $WO_3$ nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the $WO_3$ nanoparticles have an anisotropic shape such as nanorods, the particle size may refer to a length of the nanorod, a width of the nanorod, an average of the length and width of the nanorod. In some embodiments in which the $WO_3$ nanoparticles have non-spherical shapes, the particle size refers to the diameter of a sphere having an equivalent volume as the particle. In some embodiments in which the $WO_3$ nanoparticles have non-spherical shapes, the particle size refers to the diameter of a sphere having an equivalent diffusion coefficient as the particle.

In some embodiments, the $WO_3$ nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the $WO_3$ nanoparticles of the present disclosure are monodisperse having a particle size distribution ranging from 80% of the average particle size to 120% of the average particle size, preferably 90-110%, preferably 95-105% of the average particle size. In some embodiments, the $WO_3$ nanoparticles are not monodisperse.

In general, the particle size may be determined by any suitable method known to one of ordinary skill in the art. In some embodiments, the particle size is determined by powder X-ray diffraction (PXRD). Using PXRD, a crystallite size may be determined using the Scherrer equation, which relates the full-width at half-maximum (FWHM) of diffraction peaks to the size of regions comprised of a single or multiple crystalline domain(s) (known as crystallites) in the sample. In some embodiments, the particle size is the same as the crystallite size. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In preferred embodiments, the $WO_3$ nanoparticles are crystalline by PXRD.

The superconducting material also contains barium titanate nanoparticles. The barium titanate nanoparticles can be dispersed within the ReBCO matrix described above. In general, the barium titanate nanoparticles can be any shape known to one of ordinary skill in the art as described above. In some embodiments, the barium titanate nanoparticles have a mean particle size of 10 to 250 nm, preferably 15 to 200 nm, preferably 20 to 150 nm, preferably 25 to 125 nm, preferably 30 to 100 nm, preferably 35 to 75 nm, preferably 45 to 60 nm, preferably 50 nm. The barium titanate nanoparticles can be monodisperse as described above.

In preferred embodiments, the barium titanate nanoparticles are crystalline by PXRD. In some embodiments, the barium titanate nanoparticles have a cubic structure. Barium titanate having a cubic crystal structure can be referred to as "cubic barium titanate". Cubic barium titanate is different from other polymorphs of barium titanate which have different crystal structures. Examples of other polymorphs of barium titanatate include, but are not limited to, tetragonal barium titanate, orthorhombic barium titanate, and rhombohedral barium titanate.

In some embodiments, the ReBCO matrix exists in the form of grains having a mean grain size of 1 to 25 micrometers ($\mu$m), preferably 2 to 23 $\mu$m, preferably 3 to 21 $\mu$m, preferably 4 to 19 $\mu$m, preferably 5 to 17 $\mu$m, preferably 6 to 15 $\mu$m, preferably 7 to 13 $\mu$m, preferably 8 to 12 $\mu$m, preferably 9 to 11 $\mu$m, preferably 9.5 to 10.5 $\mu$m, preferably 10 $\mu$m by scanning electron microscope (SEM). In some embodiments, the ReBCO matrix exists in the form of grains having a distribution of grain sizes characterized in that the distribution is multimodal. That is, there exists in the particle size distribution more than one modal particle size. In some embodiments, the multimodal particle size distribution is bimodal. In some embodiments, the bimodal particle size distribution has a first mode of 0.1 to less than 10 $\mu$m, preferably 0.5 to 9 $\mu$m, preferably 1 to 8 $\mu$m, preferably 1.5 to 7 $\mu$m and a second mode of greater than 10 to 25 $\mu$m, preferably 11 to 23 $\mu$m, preferably 12 to 21 $\mu$m, preferably 13 to 20 $\mu$m, preferably 14 to 19 $\mu$m. In some embodiments, the ReBCO matrix has a mean crystallite size of 25 to 75 nm, preferably 27.5 to 72.5 nm, preferably 30 to 70 nm, preferably 32.5 to 67.5 nm, preferably 35 to 65 nm, preferably 37.5 to 62.5 nm, preferably 40 to 60 nm, preferably 42.5 to 57.5 nm, preferably 45 to 55 nm by powder X-ray diffraction (PXRD).

In some embodiments, the $WO_3$ nanoparticles and barium titanate nanoparticles are disposed within voids between grain boundaries of the ReBCO matrix. That is, the $WO_3$ nanoparticles and barium titanate nanoparticles are located at grain boundaries between individual grains of the ReBCO matrix. Preferably, the $WO_3$ nanoparticles and barium titanate nanoparticles are not incorporated into individual grains of the ReBCO matrix.

As described above, the ReBCO matrix typically crystallizes in a defect perovskite or layered perovskite-type crystal structure. The presence of the rare-earth ions and barium ions lowers the symmetry of the ReBCO from cubic to orthorhombic. As such, the crystal structure of the ReBCO matrix can be described by an orthorhombicity factor. The presence of the $WO_3$ and barium titanate nanoparticles can change the orthorhombicity factor compared to a pure ReBCO matrix. In some embodiments, the superconducting material has an orthorhombicity factor of $5.0 \times 10^{-3}$ to $10.0 \times$ $10^{-3}$, preferably $7.5 \times 10^{-3}$ to $9.25 \times 10^{-3}$, preferably $8 \times 10^{-3}$ to $9 \times 10^{-3}$, preferably $8.15 \times 10^{-3}$ to $8.81 \times 10^{-3}$ by PXRD. In preferred embodiments, the presence of the $WO_3$ and barium titanate nanoparticles causes the superconducting material to have a lower orthorhombicity factor compared to a similar ReBCO matrix which does not contain the $WO_3$ and barium titanate nanoparticles.

In some embodiments, the superconducting material has a superconducting transition temperature of 65 to 97.5, preferably 75 to 95, preferably 85 to 92.5, preferably 87.5 to 91, preferably 89 to 90 kelvin (K). In some embodiments, the superconducting material has a Josephson phase-locking temperature $T_{cj}$ of 50 to 80 K, preferably 55 to 77.5 K, preferably 56.5 to 76.1 K. The superconducting material preferably has a higher superconducting transition temperature compared to a similar ReBCO matrix which does not contain the $WO_3$ and barium titanate nanoparticles. The superconducting material preferably has a higher Josephson phase-locking temperature compared to a similar ReBCO matrix which does not contain the $WO_3$ and barium titanate nanoparticles.

In some embodiments, the superconducting material has a critical current density at zero applied magnetic field ($J_c(0)$) of $0.01 \times 10$+to $0.50 \times 10^4$, preferably $0.02 \times 10^4$ to $0.45 \times 10^4$, preferably $0.025 \times 10$+to $0.4 \times 10^4$, preferably $0.03 \times 10$+to $0.35 \times 10^4$, preferably $0.037 \times 10$+to $0.33 \times 10$+ ampere per square centimeters ($A \cdot cm^{-2}$). In some embodiments, the superconducting material has an accommodation field B* of 17.5 to 32.5 mT, preferably 18 to 32 mT, preferably 18.5 to 31.5 mT, preferably 19 to 31 mT, preferably 19.5 to 30.5 mT, preferably 20 to 30 mT, preferably 20.5 to 29.5 mT, preferably 21 to 28.5 mT.

In some embodiments, the superconducting material has a room temperature resistivity $\rho_n$ of $0.05 \times 10^{-2}$ to $1.75 \times 10^{-2}$, preferably $0.1 \times 10^{-2}$ to $1.7 \times 10^{-2}$, preferably $0.15 \times 10^{-2}$ to $1.65 \times 10^{-2}$, preferably $0.19 \times 10^{-2}$ to $1.66 \times 10^{-2}$ Ohm centimeter ($\Omega \cdot cm$).

The present disclosure also relates to a method of forming the superconducting material. The method includes mixing $WO_3$ nanoparticles, barium titanate nanoparticles, and ReBCO particles to form a particulate mixture, pressing the particulate mixture at a pressure of 500 to 1000 megapascals (MPa), preferably 550 to 950 MPa, preferably 600 to 900 MPa, preferably 650 to 850 MPa, preferably 700 to 800 MPa, preferably 725 to 775 MPa, preferably 750 MPa to form a solid sample, and heating the solid sample at 800 to 1100 degrees centigrade (° C.), preferably 825 to 1075° C., preferably 850 to 1050° C., preferably 875 to 1025° C., preferably 900 to 1000° C., preferably 925 to 975° C., preferably 940 to 960° C., preferably 950° C. for 1 to 24 hours, preferably 2 to 22 hours, preferably 3 to 20 hours, preferably 4 to 18 hours, preferably 5 to 16 hours, preferably 6 to 14 hours, preferably 7 to 12 hours, preferably 8 hours to form the superconducting material.

In some embodiments, the method includes the ReBCO particles that are prepared by calcining a precursor mixture comprising rare earth oxide particles, barium carbonate particles, and copper oxide particles at 800 to 1100° C. preferably 825 to 1075° C., preferably 850 to 1050° C., preferably 875 to 1025° C., preferably 900 to 1000° C., preferably 925 to 975° C., preferably 940 to 960° C., preferably 950° C. for 1 to 24 hours, preferably 2 to 22 hours, preferably 3 to 20 hours, preferably 4 to 18 hours, preferably 5 to 16 hours, preferably 6 to 14 hours, preferably 7 to 12 hours, preferably 8 hours.

Referring to FIG. 1, a schematic flow diagram of a method 100 for forming the superconducting material is illustrated.

The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes mixing $WO_3$ nanoparticles, barium titanate nanoparticles, and ReBCO particles to form a particulate mixture. In some embodiments, the ReBCO particles are yttrium barium copper oxide (YBCO) particles as described above. In some embodiments, the YBCO particles include $YBa_2Cu_3O_{7-\delta}$. In general, the ReBCO particles, $WO_3$ nanoparticles, and barium titanate nanoparticles may be mixed by any suitable technique or with any suitable equipment known to one of ordinary skill in the art. In some embodiments, the mixing involves milling. In some embodiments, the mixing involves grinding.

In some embodiments, the ReBCO particles are prepared by calcining a precursor mixture comprising rare earth oxide particles, barium carbonate particles, and copper oxide particles at preferably 825 to 1075° C., preferably 850 to 1050° C., preferably 875 to 1025° C., preferably 900 to 1000° C., preferably 925 to 975° C., preferably 940 to 960° C., preferably 950° C. for 1 to 24 hours, preferably 2 to 23 hours, preferably 3 to 22 hours, preferably 4 to 21 hours, preferably 5 to 20 hours, preferably 6 to 19 hours, preferably 7 to 18 hours, preferably 8 to 17 hours, preferably 9 to 16 hours, preferably 10 to 15 hours, preferably 11 to 14 hours, preferably 12 hours. In some embodiment, the mixture is pressed into pellets prior to calcination. In some embodiments, the YBCO is prepared by mixing yttrium oxide ($Y_2O_3$), barium carbonate ($BaCO_3$), and copper oxide (CuO) to form a precursor mixture. These materials may be mixed in any suitable ratio, but are preferably mixed in a stoichiometric ratio approaching 1:2:3 in terms of the number of moles of yttrium, barium, and copper, respectively. It should be noted here that the amount of yttrium oxide is preferably adjusted so as to take into account that two moles of yttrium atoms are provided in each mole of yttrium oxide. In some embodiments, the ReBCO particles are yttrium barium copper oxide (YBCO) particles and the rare earth oxide is yttrium oxide. In some embodiments, the barium titanate nanoparticles include cubic barium titanate.

At step 104, the method 100 includes pressing the particulate mixture at a pressure of 500 to 1000 megapascals (MPa), preferably 550 to 950 MPa, preferably 600 to 900 MPa, preferably 650 to 850 MPa, preferably 700 to 800 MPa, preferably 725 to 775 MPa, preferably 750 MPa to form a solid sample. In general, the pressing may be performed using any suitable technique or with any suitable equipment known to one of ordinary skill in the art. For example, in some embodiments, the particulate mixture is pressed using a hydraulic press.

At step 106, the method 100 includes heating the solid sample at 800 to 1100° C. preferably 825 to 1075° C., preferably 850 to 1050° C., preferably 875 to 1025° C., preferably 900 to 1000° C., preferably 925 to 975° C., preferably 940 to 960° C., preferably 950° C. for 1 to 24 hours, preferably 2 to 22 hours, preferably 3 to 20 hours, preferably 4 to 18 hours, preferably 5 to 16 hours, preferably 6 to 14 hours, preferably 7 to 12 hours, preferably 8 hours to form the superconducting material.

The examples below are intended to further illustrate protocols for preparing and characterizing the superconducting material and are not intended to limit the scope of the claims. Where a numerical limit or range is stated herein, the endpoints are included. Also, all values and subranges within a numerical limit or range are specifically included as if explicitly written out.

Obviously, numerous modifications and variations of the present disclosure are possible in light of the above teachings. It is therefore to be understood that within the scope of the appended claims, the invention may be practiced otherwise than as specifically described herein

EXAMPLES

Example 1: Synthesis Details

Figure 2A:
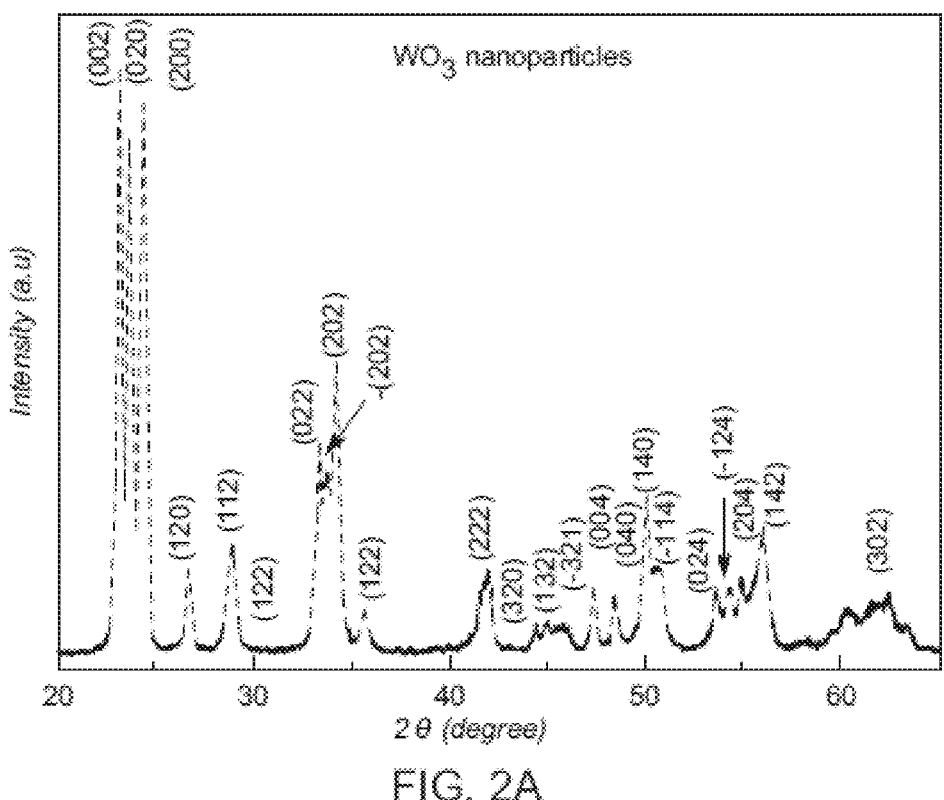
FIG. 2A illustrates an X-ray powder diffraction (XRD) patterns of tungsten trioxide ($WO_3$) nanoparticles, according to certain embodiments.
Figure 2B:
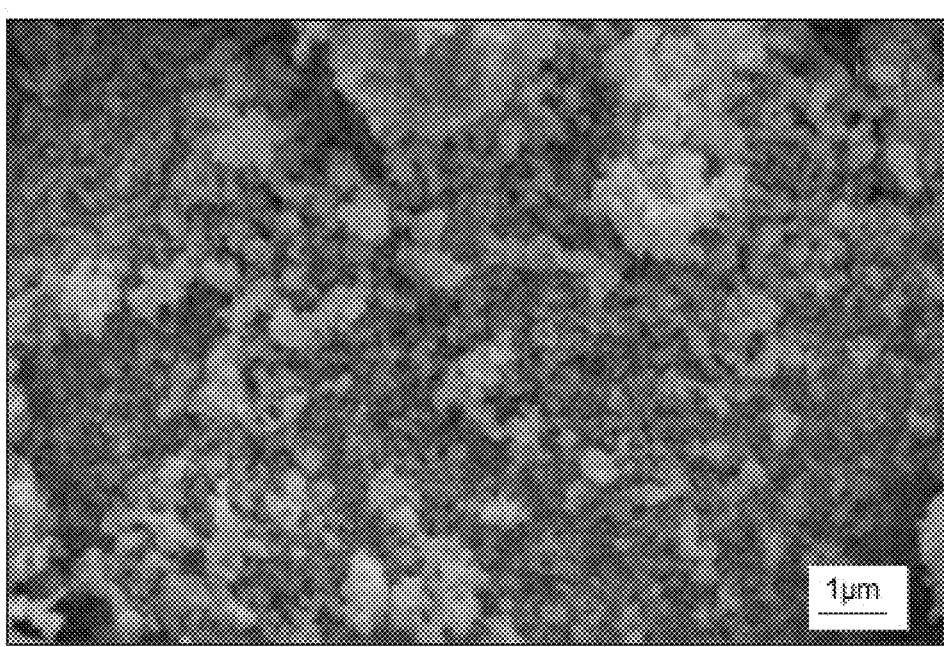
FIG. 2B illustrates XRD patterns of barium titanate (Ba-$TiO_3$/BTO) nanoparticles, according to certain embodiments.
Figure 2C:
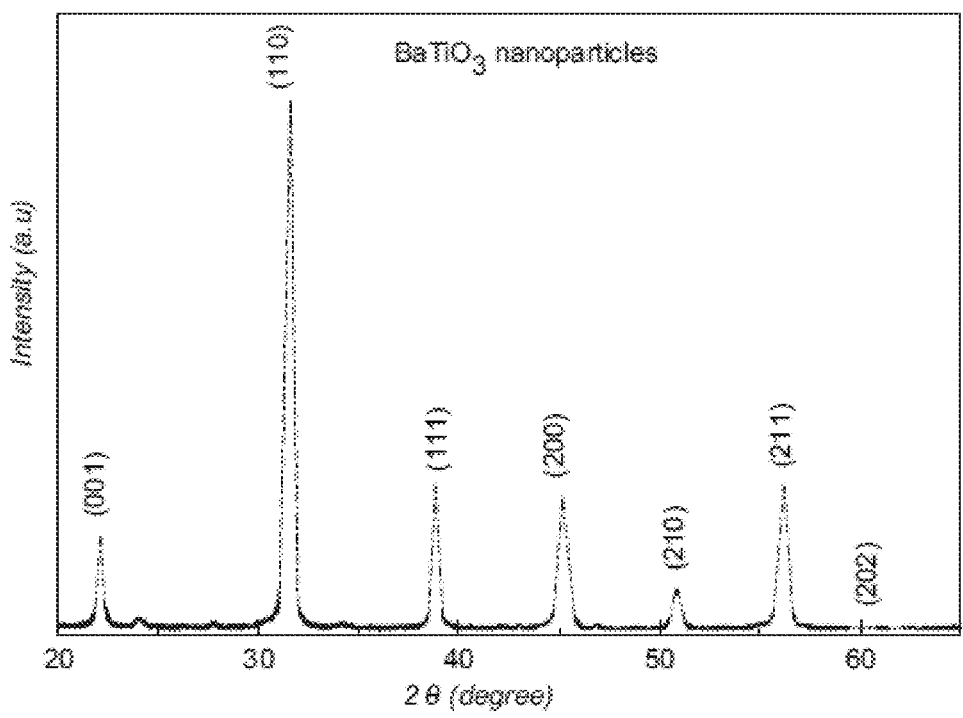
FIG. 2C illustrates a scanning electron microscope (SEM) image of $WO_3$ nanoparticles, according to certain embodiments.
Figure 2D:
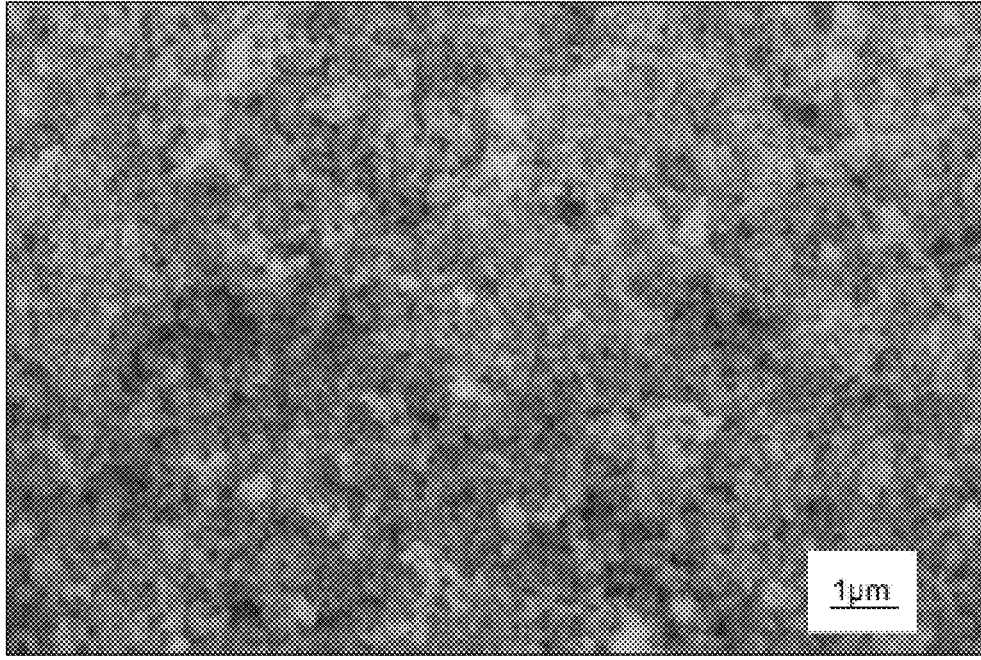
FIG. 2D illustrates SEM images of $BaTiO_3$ nanoparticles, according to certain embodiments.

Two kinds of superconducting samples, a pristine yttrium barium copper oxide (YBCO) and a yttrium barium copper oxide-barium titanate (YBCO—BaTiO$_3$)/ tungsten oxide (WO$_3$) were prepared using the solid-state reaction route. First, a precursor of YBCO was prepared by mixing in stoichiometric amounts (1:2:3) of high-purity powders of yttrium oxide (Y$_2$O$_3$), barium carbonate (BaCO$_3$), and copper oxide (CuO) purchased from Sigma-Aldrich company. The mixture was pressed into pellets and subject to the calcination step in the air at 950 degrees centigrade (° C.) for 12 hours. During the second stage, 0.10 weight percentage (wt. %) of BaTiO$_3$ and 0.10 wt. % of WO$_3$ nanoparticles (purchased from Sigma-Aldrich Company and used without further purification) were added simultaneously to the prepared YBCO precursor. Some specifications of the additives BaTiO$_3$ and WO$_3$ are listed in Table 1. FIGS. 2A and 2C illustrate x-Ray diffraction (XRD) patterns of WO$_3$ and BaTiO$_3$ phases used as additives, respectively. The analysis of the data shows that WO$_3$ crystallized in a monoclinic lattice (JCPDS card 83-0950), while BaTiO$_3$ nanoparticles crystallized in cubic structure with Pm3m group space (ICCD No. 96-150-7758). FIGS. 2B and 2D illustrate scanning electron microscope (SEM) images to confirm the presence of nano-sized particles with an average grain size of 100 nanometers (nm) and 50 nm for WO$_3$ and BaTiO$_3$, respectively. Both YBCO precursor and BaTiO$_3$/WO$_3$ powders were mixed in an agate mortar, then pelletized using a hydraulic press under a pressure of 750 megapascals (MPa), and finally placed in a muffle furnace and sintered at 950° C. for 8 hours in the air and then cooled with the rate of 4° C./min. The x=0.0 wt. % (pristine sample) was also prepared in the same conditions for comparison.

TABLE 1

| Some specifications of nanoparticles used | | |
|---|---|---|
| Specifications | BaTiO$_3$ | WO$_3$ |
| Purity % | 99.9 | 99.9 |
| Size [nm] | 50 | <100 |
| Density [g/mL] | 6.06 | 7.16 |
| Crystal structure | Cubic | Monoclinic |

Example 2: Characterization Techniques

The prepared samples were characterized by X-rays powder diffraction technique (Philips PW1710 powder diffractometer, Cu-Kα radiation source (λ=0.1546 nm)). The morphology and the chemical composition analysis were performed using SEM (model FEI Teneo) equipped with an energy dispersive x-ray analysis (EDX) detector of EDAX. Quantum Design Physical Property Measurement System (PPMS-Evercool-II) was used for direct current (DC) magnetic measurements. A Lake Shore 7130 alternating current (AC) susceptometer head attached to the PPMS was used to measure AC susceptibility versus temperature ranging between 10-110 kelvin (K).

Temperature-dependent resistivity was measured using the standard four-probe method. A vibrating sample magnetometer (VSM) was employed to measure the magnetization current density (J$_c$) data at liquid nitrogen temperature in self- and applied-magnetic fields. The J$_c$ values of the samples were determined using the critical state Bean model expression as equation (1):

$$J_{cm} = 20(\Delta M)/\omega\left(1 - \frac{\omega}{3l}\right) \tag{1}$$

where M is the width of the volume magnetization in units of electromagnetic system of units per cubic centimeters (emu/cm$^3$), and w and l are the cross-sectional dimensions of the sample perpendicular to the applied field in units of cm, with l≥w.

Example 3: Structural Analysis

Figure 3A:
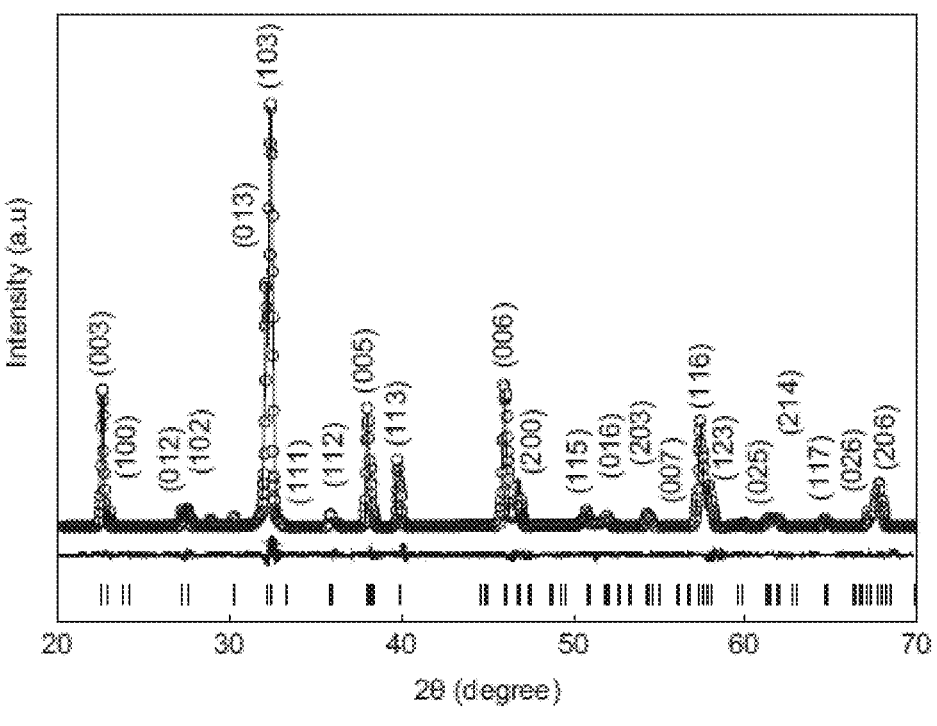
FIG. 3A illustrates experimental and refined XRD patterns of pure $YBa_2Cu_3O_{7-\delta}$ (YBCO), according to certain embodiments.
Figure 3B:
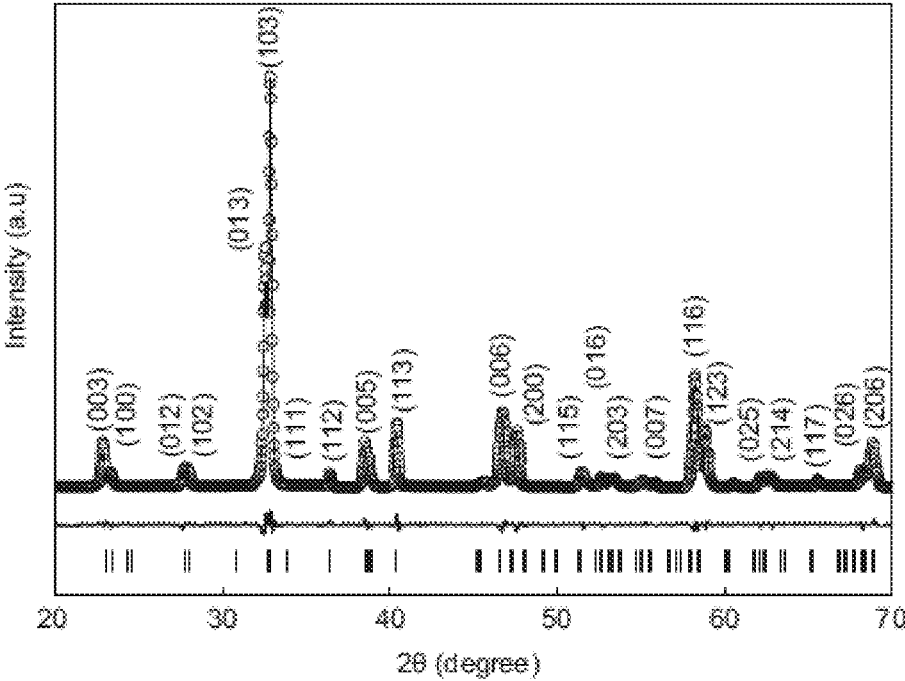
FIG. 3B illustrates an experimental and refined XRD pattern of nano-BTO/$WO_3$ co-added YBCO samples, according to certain embodiments.

FIGS. 3A-3B illustrate the experimental and refined XRD patterns of pristine YBCO (FIG. 3A) and BTO/WO$_3$ co-added YBCO samples (x=0.1 wt. %) (FIG. 3B). The XRD patterns have been refined via the Rietveld method by using Match 3! Program and Fullproof software. The relevance-factor $\chi^2$ (used as the numerical criteria for a good fitting) was about 1.85 and 2.03 for pristine YBCO and YBCO—BaTiO$_3$/WO$_3$ samples, respectively. The analysis showed that all the diffraction peaks were indexed to the orthorhombic YBCO unit cell with space group Pmmm (ICSD no. 01-078-2145). No second phases and no traces associated with BTO or WO$_3$ phases were detected for the prepared samples. The lattice parameters a, b and c, as well as the volume cell and the orthorhombicity factor were estimated. For the pristine sample, the lattice parameters a, b, and c were found to be 3.8229, 3.8909, and 11.6795 angstroms (Å), respectively. A slight change in the lattice parameters occurred by the co-addition of BTO and WO$_3$ nanoparticles. The lattice parameters a and b were found to be equal to 3.8213 and 3.8841 Å for 0.1 wt. % BTO and WO$_3$ co-added YBCO sample, while the lattice parameter c was increased to 11.6897 Å compared to the pristine sample. The slight variation in the lattice parameters affected the orthorhombicity factor (Orth. Fac=(b−a)/(a+b)) and the unit cell volume (V). The Orth. Fac showed a decrease but not too noticeable, from 8.81×10$^{-3}$ from pristine sample to 8.15× 10$^{-3}$ for 0.1 wt. % co-added sample. The combined addition of BTO and WO$_3$ nanoparticles led also to the shrinking of the perovskite layer in the structure. All these results indicated that the co-addition of BTO and WO$_3$ might enter the crystal structure of YBCO and has possibly modified the oxygen ordering in the material.

Figures 4A, 4B:
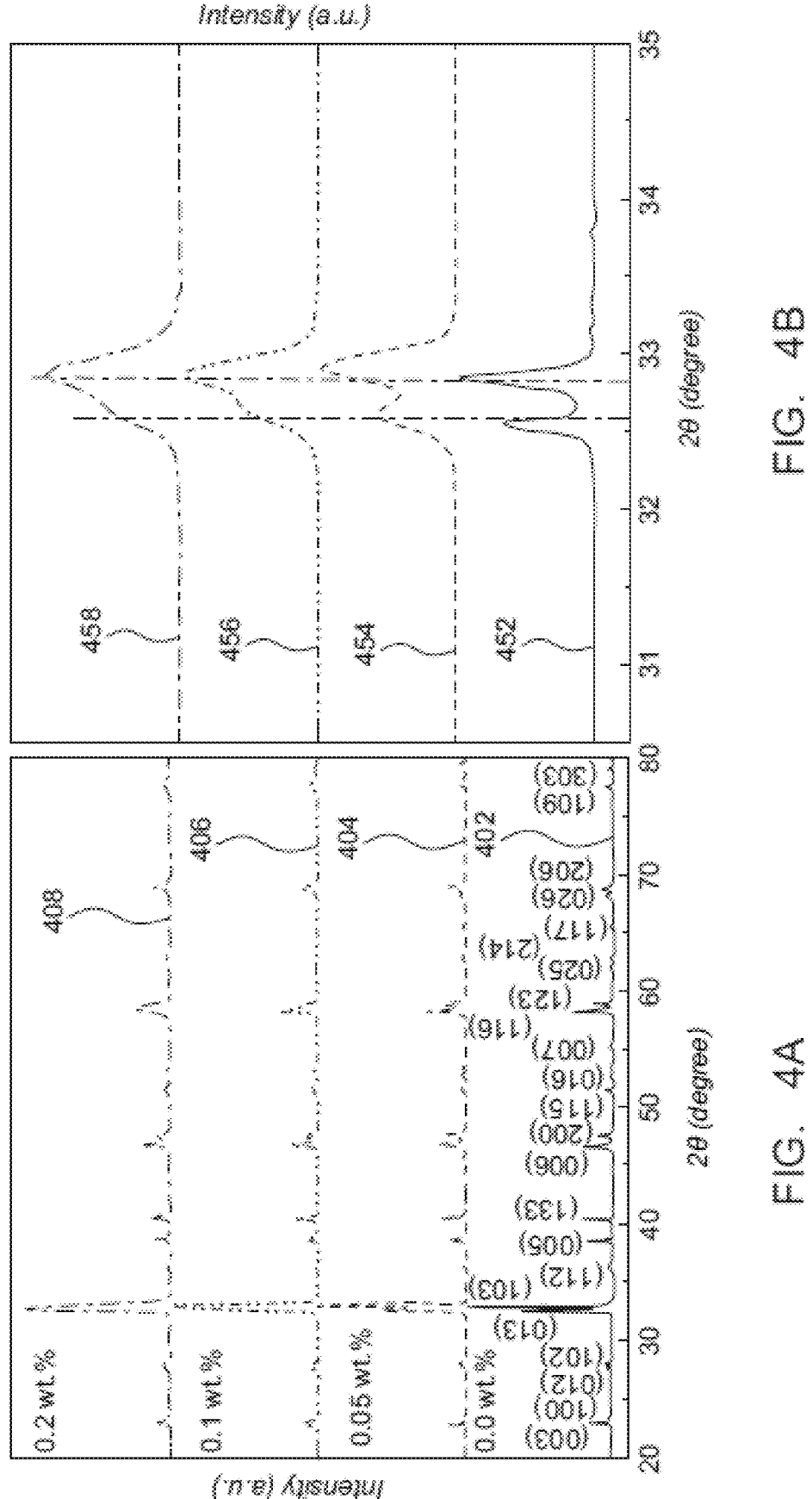
FIG. 4A illustrates XRD patterns of sintered samples, according to certain embodiments.
FIG. 4B illustrates an enlarged view of the XRD pattern showing the evolution of splitting of the peaks (013)/(130) at $2\theta \approx 32.6°$ and $2\theta \approx 32.8°$, according to certain embodiments.

FIGS. 4A-4B illustrate the XRD of the (1−x) Y−(x) BTO/WO$_3$ samples (where x=0.00, 0.05, 0.10 and 0.20). FIG. 4A illustrates XRD patterns of sintered samples where x=0.00 (402), 0.05 (404), 0.10 (406) and 0.20 (408). The analysis showed that all the major diffraction peaks might be indexed to the pure YBCO phase. Under the limit detection of the XRD instrument, no secondary phases were detected. Also, no traces related to BTO or $WO_3$ were detected for all samples.

Since BTO and $WO_3$ have a high melting point of 1625° C. and 1473° C., respectively, higher than the YBCO phase, a reaction between them and YBCO was unlikely. The pure sample showed an orthorhombic structure with Pmmm space group. The YBCO splitting peaks with high intensity were observed at the positions of 2θ≈32.6° and 2θ≈32.8° corresponding to the Miller indices of (0 1 3) and (1 0 3), respectively. FIG. 4B clearly indicates that the co-addition of BTO and $WO_3$ nanoparticles shifted the peaks slightly to a higher angle of 2θ. FIG. 4B illustrates the XRD pattern showing the evolution of splitting of the peaks (013)/(130) at 2θ≈32.6° and 2θ≈32.8° where x=0.00 (452), 0.05 (454), 0.10 (456) and 0.20 (458).

The shift in the peaks indicates that the 0.05 wt. % co-addition of BTO and $WO_3$ was incorporated into the YBCO phase leading to a variation in the lattice parameters and resulting in the perturbation of the crystal structure of YBCO. Also, the splitting peaks observed in pure sample at 2θ≈32.6° and 2θ≈32.8° was preserved in 0.05 wt. % of BTO and $WO_3$ nanoparticles co-addition, indicating that the sample concentration disturbs the crystalline structure without entirely destroying their orthorhombic nature. However, the splitting peaks tend to merge on one single peak with further increasing the content of BTO and $WO_3$ nanopar-ticles (i.e., 0.1 and 0.2 wt. %) indicated that a phase transition from orthorhombic to the tetragonal structure would occur with a further increase in the content of BTO and $WO_3$. Based on the previous experiment, there was no clear change in the orthorhombicity when adding $WO_3$ nanoparticles to YBCO even at a high concentration x=1.0 wt. %. Accordingly, the occurrence of phase transition from orthorhombic to tetragonal structure in BTO and $WO_3$ co-addition was mainly attributed to the BTO nanophase that was expected to reside at the grain boundaries and also to some amount of Ti derived from the BTO phase, which goes into lattice sites in the YBCO composite. Table 1 lists the lattice parameters of a-, b-, and c-axis, the distortion δ(b−a)/(b+a) and the unit cell volume V obtained by refining the experimental data of XRD using the Rietveld refinement method by means of match 3!. The orthorhombic distortion reduces with increasing the content of BTO, $WO_3$ nanopar-ticles. Orthorhombic distortion was consistent with the beginning of decay of the splitting in the intense peaks at 2θ≈32.6° and 2θ≈32.8° (FIG. 4B). The diminution of the orthorhombic distortion was a sign of the rise of oxygen vacancy in CuO chains. Since the crystal structure of YBCO phase was principally dictated by oxygen ordering, this reduced distortion with the co-addition of BTO, $WO_3$ nan-oparticles might be due to the ordering of oxygen vacancy in the material. The variation of lattice parameters resulted in a slight change of the unit cell volume (V). The change in V was most probably affected due to the difference in the atomic radius between YBCO phase and BTO, $WO_3$ nano-phases. A shrinking of the perovskite layer in the structure was observed in the samples with x 0.05 and x=0.1 wt. % co-addition. However, a slight increase in the unit cell volume for the sample with x=0.2 wt. % was observed, when compared to pure sample, most probably due to the increased amount of BTO/$WO_3$ addition into the material. Thus, the unit cell might be enlarged to some extent by the excessive addition of BTO and $WO_3$ nanoparticles within the matrix of YBCO.

The average crystallites size of the prepared samples was calculated using the Scherrer equation 2:

$$D_{XRD} = \frac{0.9\lambda}{\beta_{FWHM}\cos\theta} \tag{2}$$

Here, λ is the wavelength of CuKα radiation (0.15406 nm), $\beta_{FWHM}$ is the full width at half maximum, and θ is the angle. The values of crystallite size were found to be about 75.0 and 47.3 nm for pristine YBCO and 0.1 wt % YBCO—$BaTiO_3$/$WO_3$ samples shown in FIGS. 3A-3B, respectively.

Figure 4C:
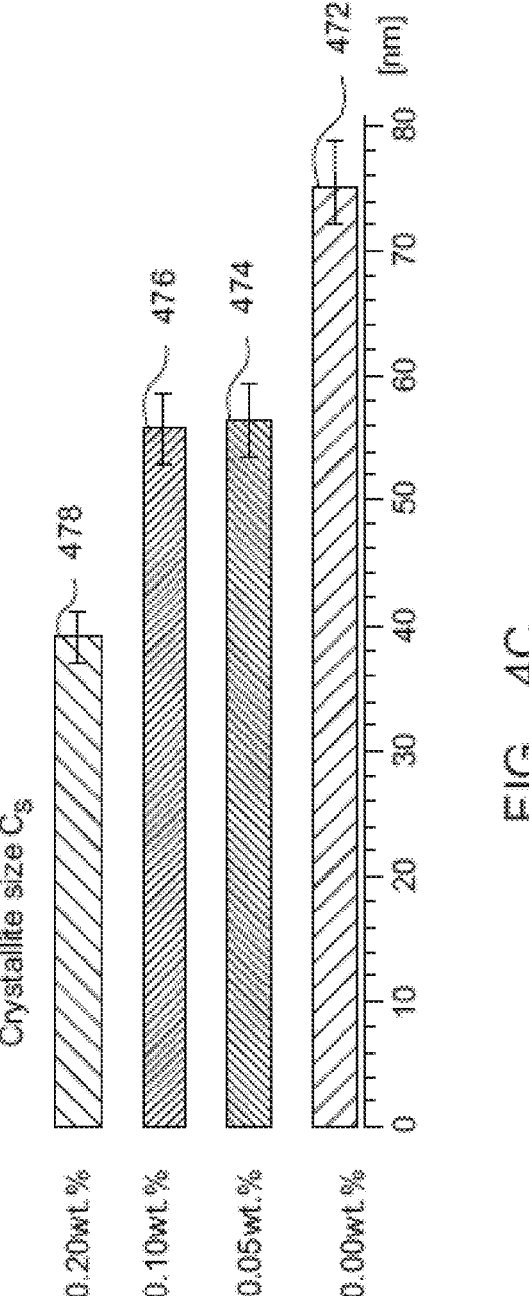
FIG. 4C illustrates an evolution of crystallite size with the concentration of BTO/$WO_3$ co-dopants, according to certain embodiments.
Figures 4D, 4E:
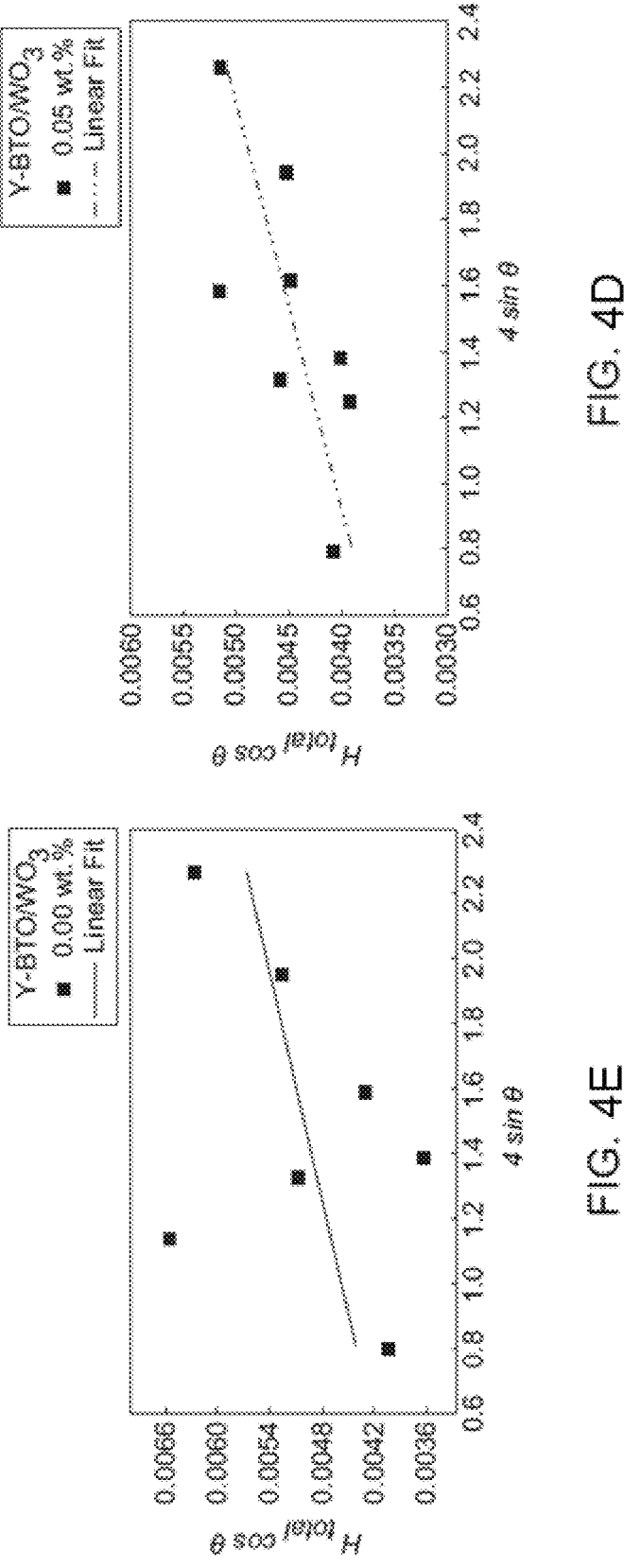
FIGS. 4D-4G illustrate plots of $H_{total} \cos\theta$ versus $4\sin\theta$ for the determination of crystallite size $c_s$ and lattice strain $L_s$ at samples added with 0.0 wt. %, 0.05 wt. %, 0.10 wt. %, and 0.20 wt. % Y-BTO-$WO_3$, respectively, according to certain embodiments.
Figures 4F, 4G:
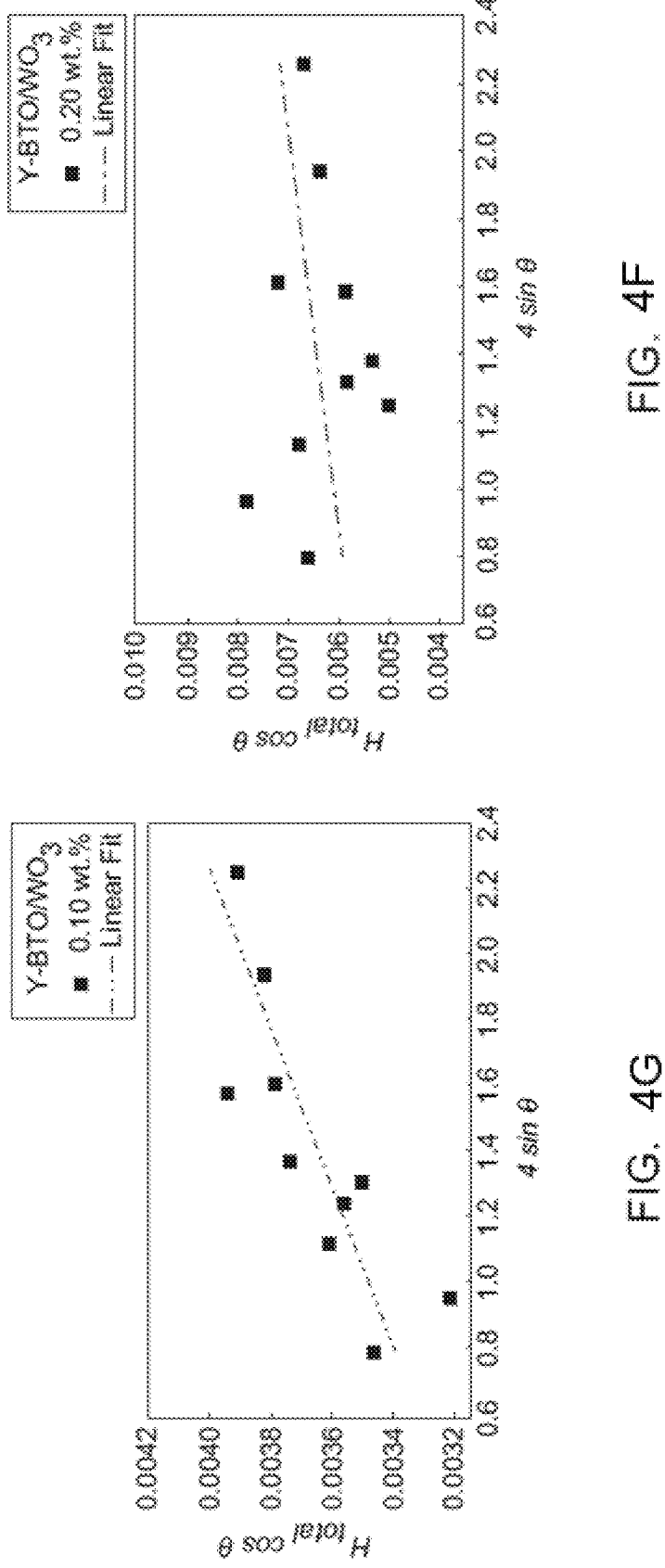

FIG. 4C illustrates the different values at concentration of 0.00 wt. % (472), 0.05 wt. % (474), 0.10 wt. % (476), and 0.20 wt. % (478) BTO/$WO_3$ co-dopants. On average, all the samples with co-addition of $WO_3$ and BTO have smaller crystallite sizes than that of the pure YBCO. Different reasons may be accountable for this observed change: (i) Change in the synthesis conditions: as all samples were prepared in the same conditions, the probability of change proposition was not expected to be considerable. (ii) forma-tion of additional crystal defects in the material: when YBCO was added by nanosized particles, extra imperfec-tions will induce. The imperfections would lead to a distor-tion and internal stress in the matrix. The reduction in grains size has been also reported previously in other doped YBCO samples. Previously an experiment examined the effect of the change in particle size on the defect's formation. They found that the reduction of particle size resulted in the formation of cracks. The size conduces to the improvement of the morphology of YBCO superconducting films. In the meantime, Williamson-Hall plots were exploited to deter-mine both the $c_s$ and $L_s$ of the samples using the following expression/equation 8:

$$H_{total}=H_{size}+H_{strain}=K\lambda/H_{size}\cos\theta+4L_s\tan\theta \tag{8}$$

Here $H_{strain}$ is the strain broadening. FIGS. 4D-4G illus-trate by multiplying equation 8 by cos θ; the plots of $H_{total}$ cosθ versus 4 sin θ give the values of $c_s$ (deduced from the intercept to Y-axis) and $L_s$ (deduced from the slope) as equation 9:

$$H_{total}\cos\theta=K\lambda/c_s+4L_s\sin\theta \tag{9}$$

It is visible from Table 3 that the evolution of cs using both methods displays the same tendency. The lattice strain ($L_s$) decreased from $8.697\times10^{-4}$ for the pure sample to 8.314, 6.137, 8.560 for 0.05, 0.1, 0.2 co-added BTO/$WO_3$ samples, respectively. The plot shows samples added with 0.0 (FIG. 4D), 0.05 (FIG. 4E), 0.10 (FIG. 4F), and 0.20 wt. % (FIG. 4G) Y-BTO-$WO_3$, respectively. Based on these XRD results, it appears that 0.05 wt. % of BTO/$WO_3$ was a convenient content that would be expected to contain good pinning centers for YBCO. To validate the results, an accurate tuning of other properties such as superconductivity and transport properties as well as flux pinning ability was compulsory.

TABLE 3

Lattice parameters (a, b and c), orthorhombic distortion (δ), unit
cell volume (V) obtained from XRD refinement and crystallites size ($c_s$) and
the lattice strain ($L_s$) deduced from Williamson-Hall method

| Compositions | XRD refined parameters | | | | Williamson-Hall method | | |
|---|---|---|---|---|---|---|---|
| Y-BTO/WO₃ | a (Å) | b (Å) | c (Å) | δ = (b − a)/(b + a) | Volume (Å3) | $c_s$ (nm) | $L_s$ × 10−4 |
| 0.00 wt. % | 3.823 | 3.891 | 11.679 | 0.0088 | 173.727 | 60 | 8.697 |
| 0.05 wt. % | 3.821 | 3.884 | 11.689 | 0.0082 | 173.502 | 45.4 | 8.314 |
| 0.10 wt. % | 3.831 | 3.884 | 11.661 | 0.0069 | 173.527 | 43.3 | 6.137 |
| 0.20 wt. % | 3.834 | 3.886 | 11.664 | 0.0067 | 173.761 | 26.5 | 8.56 |

The density of samples was also determined, and they are found to be around 6.8 $g/cm^3$ and 8.1 $g/cm^3$ for pristine YBCO and YBCO—BaTiO₃/WO₃ samples, respectively.

Example 4: Microstructural and EDX Analysis

Figure 5A:
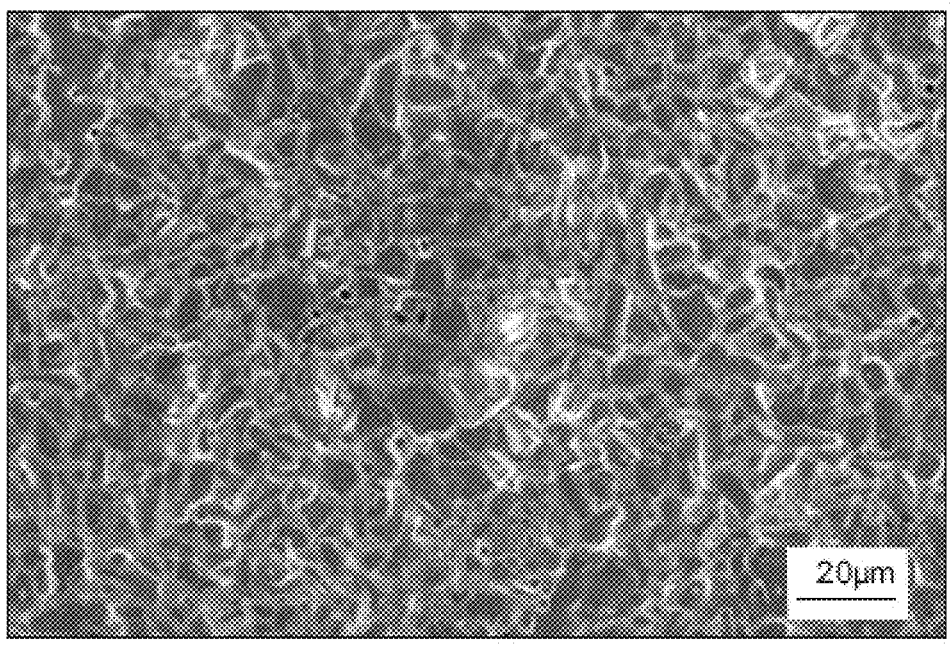
FIG. 5A illustrates a surface morphology of the sample co-added by BTO and $WO_3$ nanoparticles, according to certain embodiments.
Figure 5B:
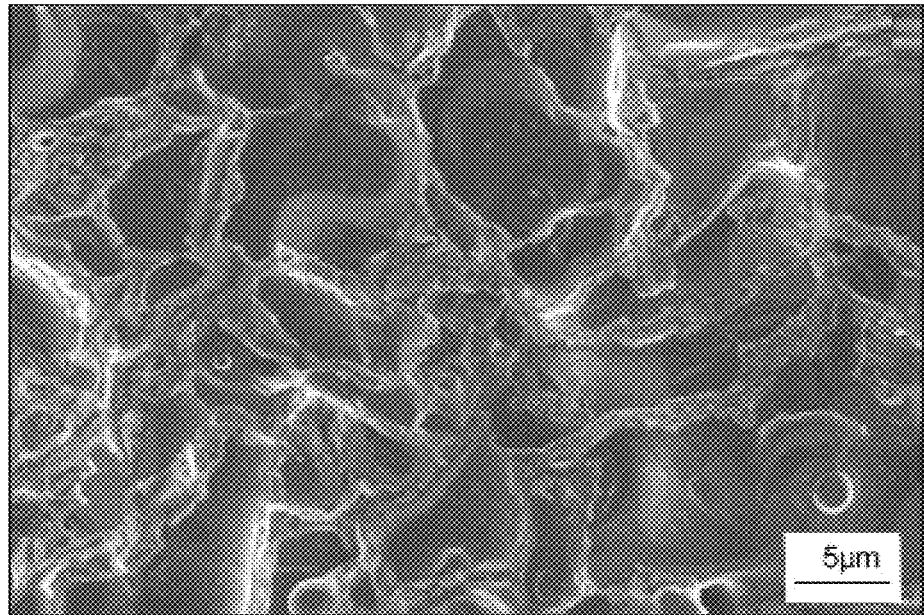
FIG. 5B illustrates SEM image performed at high magnification for sample co-added by the BTO and the $WO_3$ nanoparticles, according to certain embodiments.
Figures 6A, 6B:
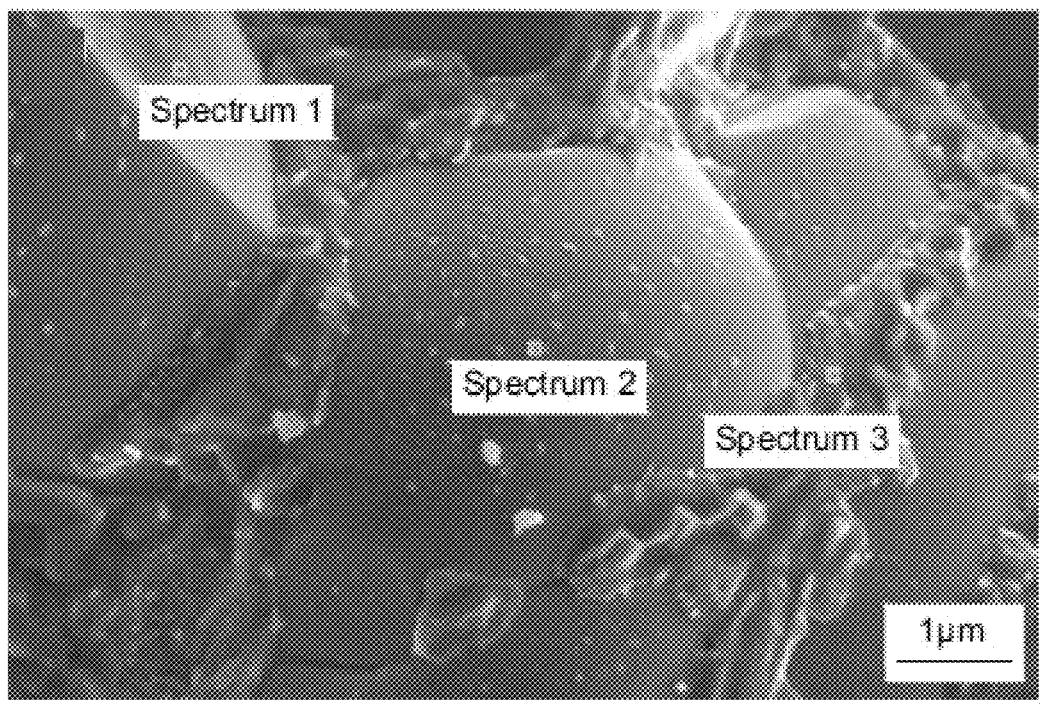
FIG. 6A illustrates a closer look at much higher magnification for sample co-added by BTO and $WO_3$ nanoparticles showing the dispersion of spherical shape entities at the surface of micrometric YBCO grains and some aggregations at grain boundaries binding the YBCO granules, according to certain embodiments.
FIG. 6B illustrates a typical energy dispersive X-ray (EDX) analysis performed at the regions where nano entities are present and absent, according to certain embodiments.

FIGS. 5A-5B display the surface morphology of the YBCO sample co-added by BTO and WO₃ nanoparticles. FIG. 5A illustrates the low magnification image as a well-compacted granular structure with minimal pore density. The grains had irregular geometry with different sizes in the range of 10 micrometers (μm) and were cemented together by even smaller granules. FIG. 5B illustrates the spots that were clearly observed for the SEM image performed at high magnification. These small particles were seen settled to the surface of the YBCO matrix. The connectivity between the grains was more clearly distinguished as the filler material appears between the boundaries of the grains. The fine nano-scale entities embedded in the superconductor might give rise to much disorder and fine-scaled defects in the grain boundary regions. FIG. 6A illustrates a closer look at much higher magnification which reveals the spherical shape entities of even finer particles evenly spread over the surface of micrometric grains. Also, aggregates derived from additives were observed at grain boundaries binding the YBCO granules. To estimate the elemental composition in the prepared sample, comparative analyses have been carried out. The EDX analysis was taken from different regions including micrometric grains, nanometric entities, and grain boundaries. FIG. 6B illustrates all atomic percentages in the table. The analysis performed in the region where the small entities were absent indicates the presence of oxygen (O), yttrium (Y), barium (Ba), and copper (Cu) elements correspond to the nominal composition of YBCO (spectrum 1). In the regions containing high-density of nano-sized entities, tungsten (W) element was detected in addition to O, Y, Ba, and Cu elements (spectrum 2). Titanium (Ti) element was also detected but with a lower atomic percentage when compared to W. The atomic percentage of W indicated that the majority of nano-sized entities embedded on the surface of grain were derived from WO₃ nanoparticles. However, at grain boundaries extents, the EDX results confirmed the presence of O, Y, Ba, Cu, W, and Ti elements (spectrum 3). The atomic percentage of Ti (derided from BTO nanoparticles) was higher than W. Again, the atomic percentage here meant that BTO nanoparticles prefer to reside at grain boundaries playing the role of bridges that facilitated the contact surface between the superconducting grains resulting in sample compactness. Hence, the dispersion of W-rich nano-entities on the grain surface, and the presence of both BTO and WO₃ at the grain's boundaries might act as catalysts to enhance the inter-granular quality of the samples, thereby improving the pinning properties.

Example 5: Magnetization Hysteresis Loops Analysis

Figure 7A:
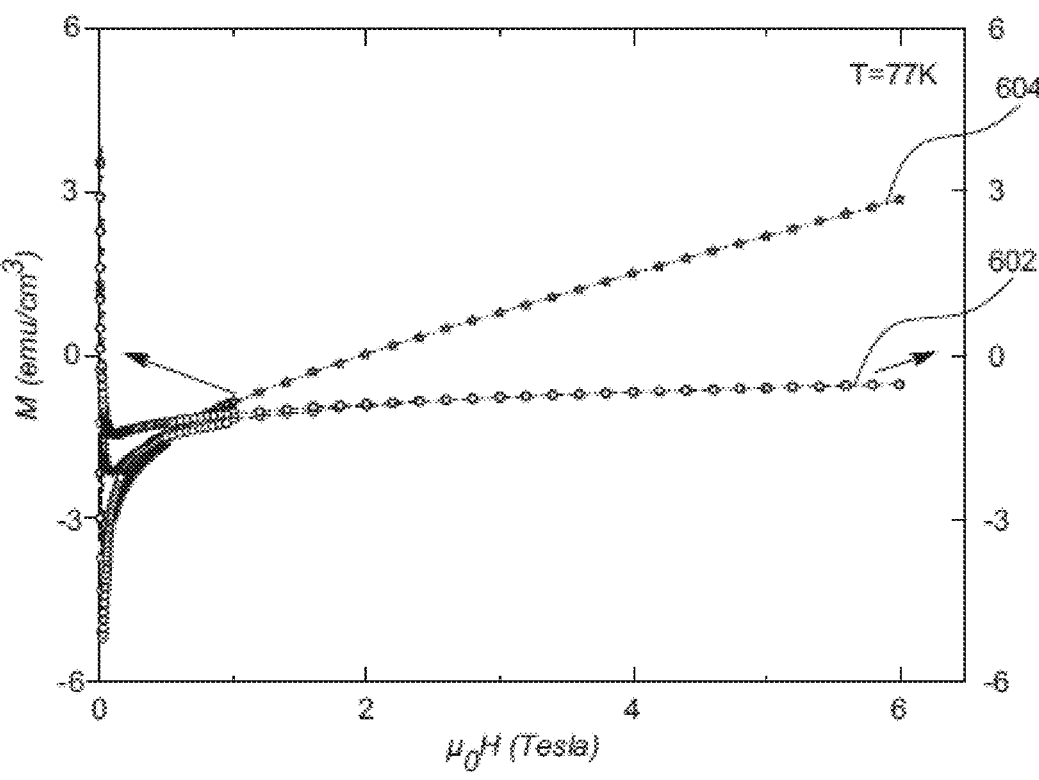
FIGS. 7A-7B illustrate isothermal magnetization curves versus applied magnetic field at T=77K for pristine and co-added BTO/$WO_3$ samples, according to certain embodiments.
Figure 7B:
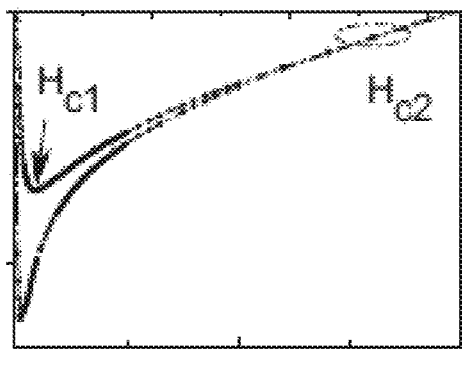
Figure 8A:
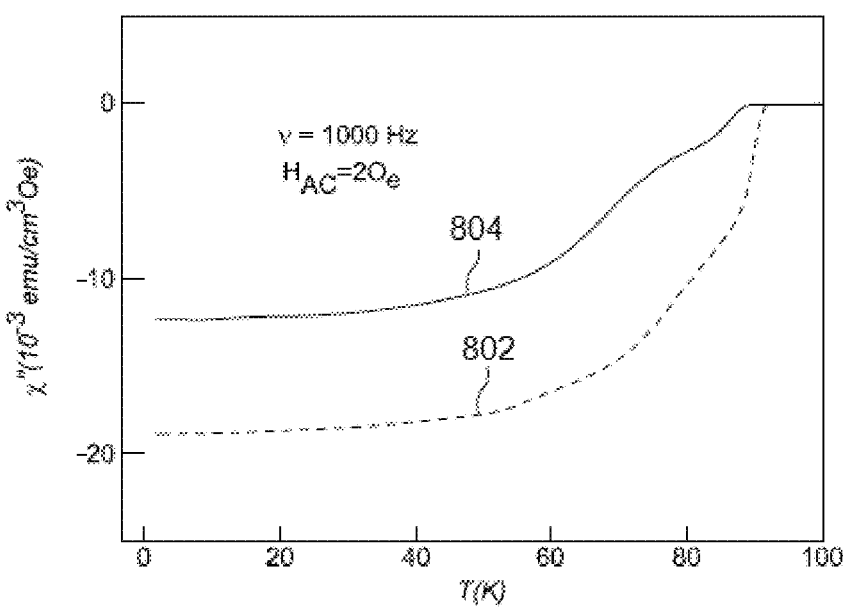
FIG. 8A illustrates an alternating current (AC) susceptibility $\chi'$ curves versus temperature ($\chi'$-T) of the pristine and BTO/$WO_3$ co-added YBCO samples at $H_{AC}$ of 2 Oersted (Oe), according to certain embodiments.
Figure 8B:
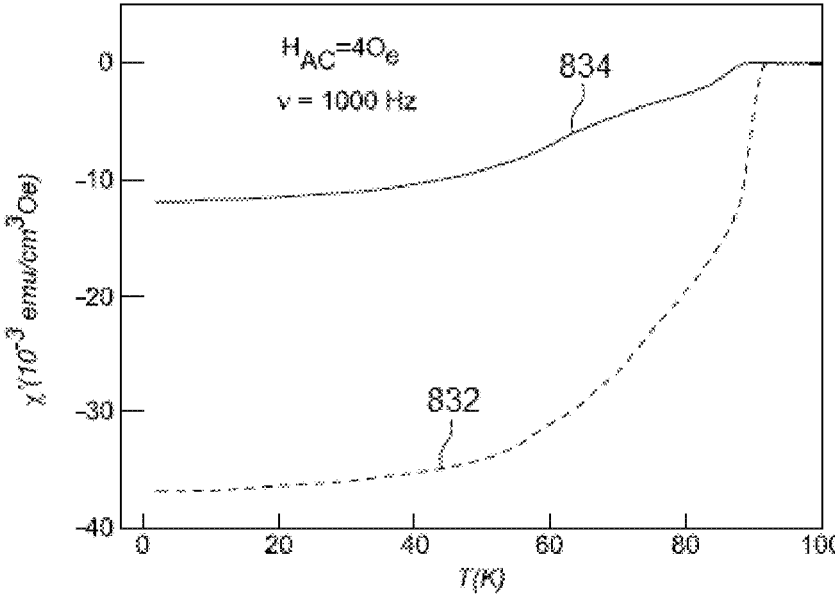
FIG. 8B illustrates AC susceptibility $\chi'$ curves versus temperature ($\chi'$-T) of the pristine and BTO/$WO_3$ co-added YBCO samples at $H_{AC}$ of 4 Oe, according to certain embodiments.
Figure 8C:
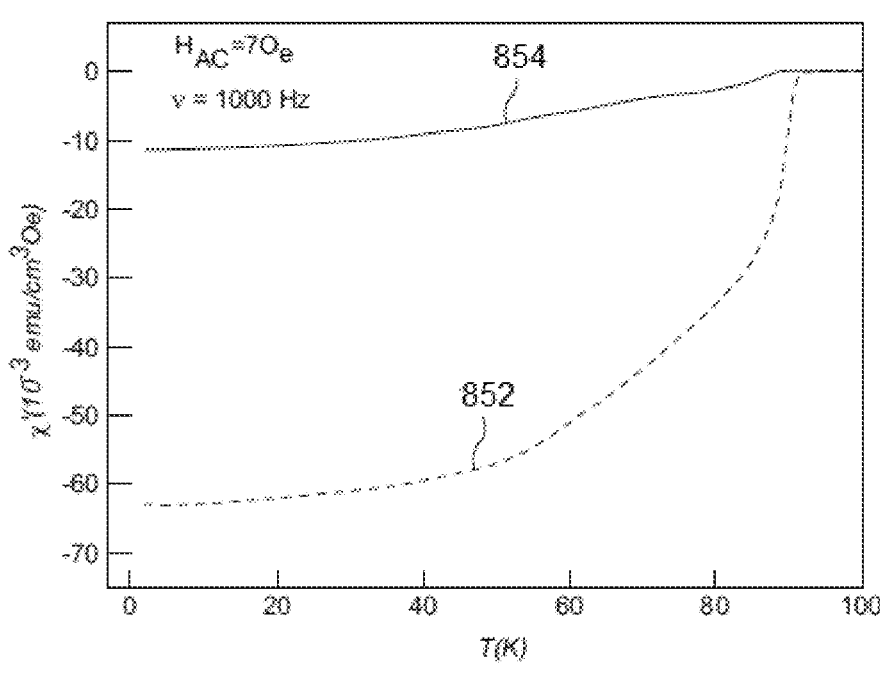
FIG. 8C illustrates AC susceptibility $\chi'$ curves versus temperature ($\chi'$-T) of the pristine and BTO/$WO_3$ co-added YBCO samples at $H_{AC}$ of 7 Oe, according to certain embodiments.
Figure 8D:
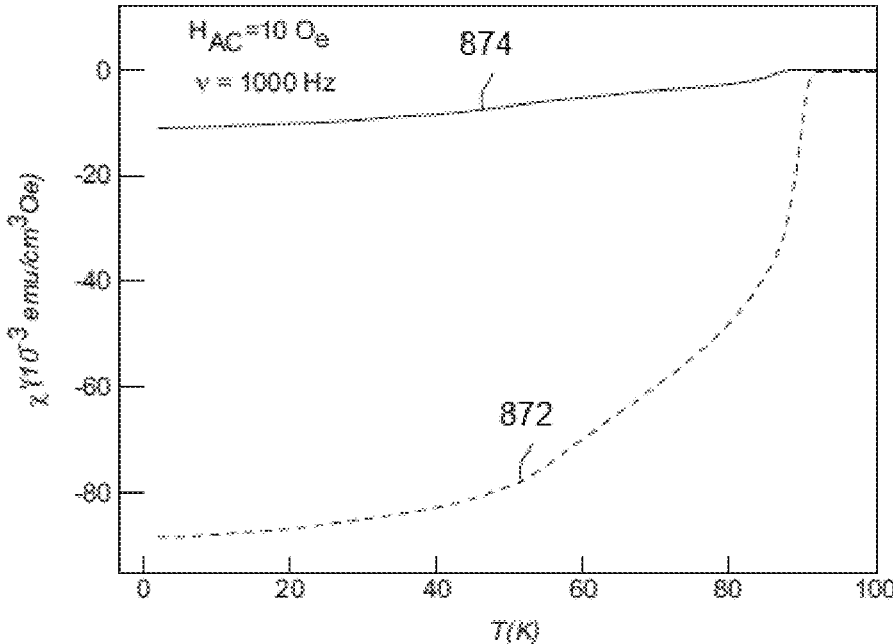
FIG. 8D illustrates AC susceptibility $\chi'$ curves versus temperature ($\chi'$-T) of the pristine and BTO/$WO_3$ co-added YBCO samples at $H_{AC}$ of 10 Oe, according to certain embodiments.

FIG. 7A illustrates the isothermal magnetization curves recorded at 77 K versus the applied magnetic field. As the magnetic field increased from zero, the magnetization decreased to $H_{c1}$ (FIG. 7B) suggesting diamagnetic character. Beyond the magnetic field $H_{c1}$, flux lines started to penetrate the sample resulting in the creation of vortices. The density of normal cores (flux lines) was ruled by the equilibrium between the decrease in the free energy and the common repulsion between the vortices. With increased field, flux lines huddle closer together, so the mean flux lines density rose in the material until reaching $H_{c2}$. Above $H_{c2}$, the material was totally in the normal state. Based on Anderson and Kim's assumption, the normal core in the mixed state of a superconductor might be trapped by various interactions such as secondary phases, impurities, strain, crystal defects, and so on. The competition between flux motion and flux pinning results in irreversibly in magnetization hysteresis loops. It was discerned that the magnetization was improved, and the width of hysteresis loops was wider with WO₃/BTO co-addition 702 compared to the pristine sample 704. The width and the behavior of the hysteresis loop were clear signs of the value of the critical current density. The broader the hysteresis loop, the greater the critical current density will be. The values of $H_{c2}$ are 1.6 and 3.4 T for pristine and co-added samples, respectively. The results indicated that WO₃/BTO co-added YBCO sample 702 required higher applied fields than the pristine sample 702 to close the magnetization hysteresis loops. Hence, the combined introduction of WO₃/BTO nanoparticles within YBCO was responsible for the pinning of vortices and consequently led to an enhancement of the critical current density in the material.

Example 6: Field Dependence of AC Susceptibility (χ-T) Analysis

FIGS. 8A-8D illustrate the real part of AC susceptibility χ' curves versus temperature (χ'-T) of the pristine and BTO/WO₃ co-added samples. All AC susceptibility measurements were done at a fixed frequency v=1000 Hz and various fields $H_{AC}$=2 (FIG. 8A), 4 (FIG. 8B), 7 (FIG. 8C), and 10 (FIG. 8D) Oe. In the FIGS. 8A-8D, 804, 834, 854, and 874 depict pristine YBCO sample and 802, 832, 852, and 872 depict BTO/WO₃ co-added samples. In polycrystalline high-temperature superconductors (HTS), the real part χ' represents normally diamagnet shielding currents in intra-and inter-granular superconducting whereas imaginary part $\chi''$ designates the hysteric dissipation owing to vortices motion. The real part ($\chi'$) curves of both prepared samples consisted of two transitions, associated with flux expelled from intra-granular and intergranular regions. This behavior was known for the HTS materials because of their inter-granular nature and the semi-insulating grain boundaries present between the superconducting grains. Consequently, the $\chi'$ of pristine and BTO/WO$_3$ co-added YBCO samples display a steep transition at critical temperature T$_c$ owing to the granular behavior of the YBCO system, while the lower part at low temperatures confirmed diamagnetic transition owing to intergranular properties. The lower part region at a low temperature was strongly influenced by the number of weak links between the grains and the grain connectivity. The transition to the diamagnetism state was sharper in BTO/WO$_3$ co-added sample compared to the pristine sample. Interestingly, diamagnetism transition ore sharper as H$_{AC}$ increased. The increased H$_{AC}$ result was consistent with that obtained in YBCO added with different amounts of silver (Ag). However, with increased H$_{AC}$ from 2 Oe to 10 Oe, the pristine YBCO sample (804, 834, 854, and 874) had a relatively wider transition in the diamagnetic regime due to the flux motion that weakened the inter-grain coupling in the samples. The transition indicated that inter-grain coupling was enhanced with the combined addition of BTO and WO$_3$ nanoparticles. HTS systems might be represented as a collection of weak Josephson coupling in which grains were coupled through the Josephson currents. These weakly coupled grains were known to reduce the critical current density values of these materials. When the material was exposed to a magnetic field, two types of current systems were induced, viz. intergranular and intragranular currents. Ambegaokar-Baratoff proposed a relation that correlates the Josephson energy coupling Ej and the Josephson current as equation 3:

$$Ej = h/4\pi e I_0 \qquad (3)$$

Where h is the Planck constant, e is the elementary charge, and I$_0$ is the maximum Josephson current that passes through the grain's boundaries and can be expressed as equation 4:

$$I_0 = 1.57 \times 10^{-8} \left( \frac{T_c^2}{T_c - T_{cj}} \right) \qquad (4)$$

T$_c$ is the onset temperature of decoupling of the grains and T$_{cj}$ depicts the Josephson phase-locking temperature that limits the phase-locked and phases fluctuation dominated behavior, associating with coupling and decoupling of grains, respectively. In the temperature range between T$_c$ and T$_{cj}$, the superconducting grains were decoupled, and the material become wholly resistive even if all individual grains were remaining strongly superconductive. Below T$_{cj}$, the grains were coupled (phase-locked).

Figure 9A:
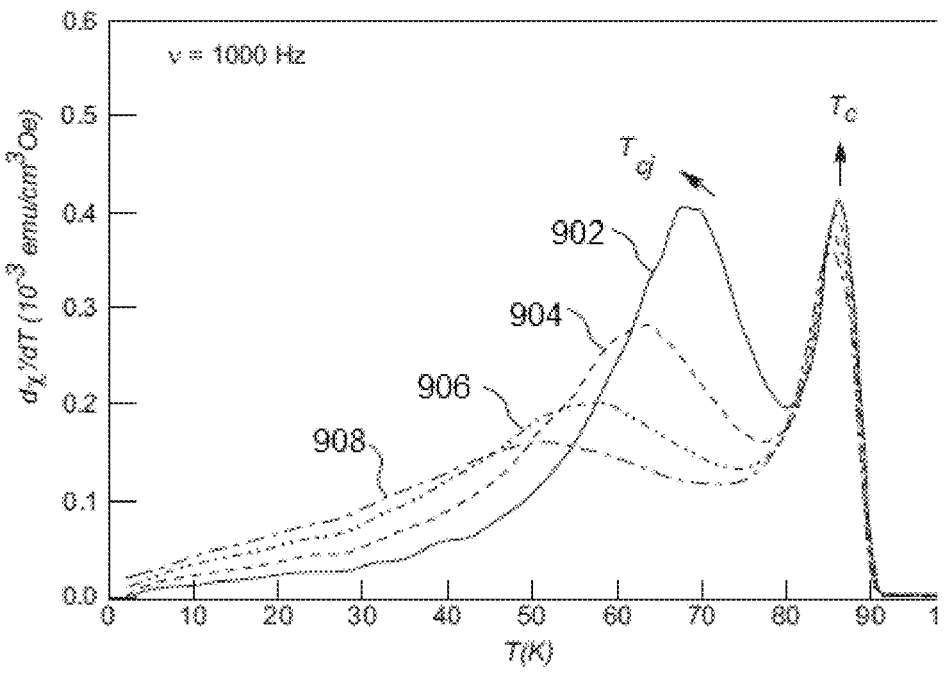
FIG. 9A illustrates plots of $d\chi'/dT$ versus temperature at various $H_{AC}$ of 2, 4, 7, 10 Oe for pristine, according to certain embodiments.
Figure 9B:
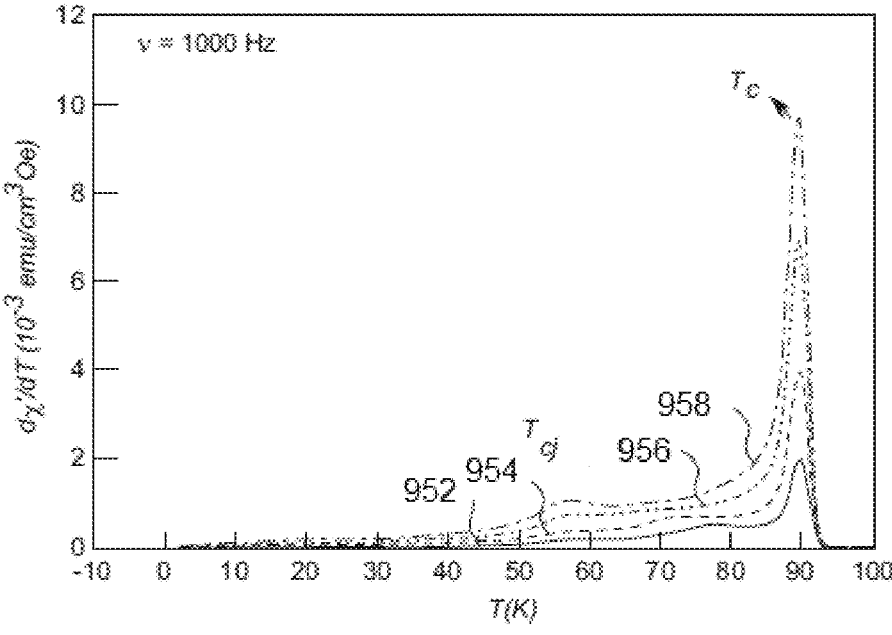
FIG. 9B illustrates plots of $d\chi'/dT$ versus temperature at various $H_{AC}$ of 2, 4, 7, 10 Oe for BTO/$WO_3$ co-added YBCO samples, according to certain embodiments.
Figure 10:
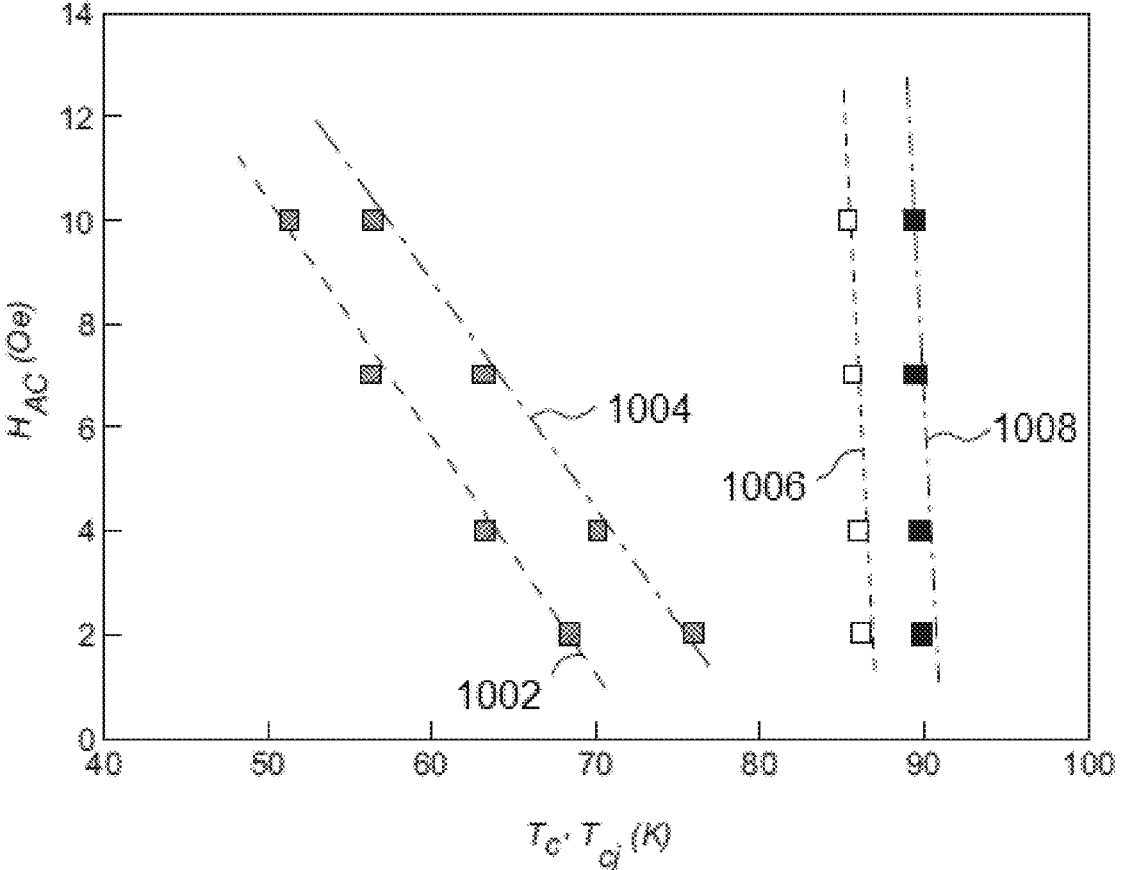
FIG. 10 illustrates an evolution of $T_c$ and $T_{cj}$ with $H_{AC}$ for the pristine and BTO/$WO_3$ co-added samples, according to certain embodiments.

FIGS. 9A-9B illustrate T$_c$ and T$_{cj}$ were determined from the peaks of the derivative of $\chi$ versus temperature, d$\chi'$/dT. The plots of d$\chi'$/dT vs. temperature show two distinctive peaks for the pristine sample (FIG. 9A). The plots at various H$_{AC}$ are 2 Oe 902, 4 Oe 904, 7 Oe 906, and 10 Oe 908. Whereas in the co-added BTO/WO$_3$ sample (FIG. 9B), a sharp peak is observed at high temperature and the second peak looked like a hump in the low-temperature region. The plots at various H$_{AC}$ are 2 Oe 952, 4 Oe 954, 7 Oe 956, and 10 Oe 958. The values of T$_c$, T$_{cj}$ for both pristine and co-added samples are listed in Table 1. Overall, the values of T$_c$, and T$_{cj}$ were higher in co-added BTO/WO$_3$ compared to pristine one. With increased H$_{AC}$, the values of T$_c$ did not show a notable variation for both prepared samples. However, T$_{cj}$ showed a decrease as H$_{AC}$ increased. FIG. 10 illustrates the evolution of T$_c$ and T$_{cj}$ with H$_{AC}$. The difference between T$_c$ and T$_{cj}$ was higher in the pristine sample (1002 and 1006) compared to the co-added BTO/WO$_3$ one (1004 and 1008). The difference confirmed that the decoupling of grains was reduced with the combined addition of BTO and WO$_3$ into YBCO material, leading to the strengthening of intergranular coupling due to the dispersion of BTO/WO$_3$ at the grain boundaries. The deduced I$_0$ and E$_j$ values for various H$_{AC}$ are also listed in Table 2. At H$_{AC}$=1 Oe, the maximum Josephson current, as well as the Josephson energy coupling, were found to be 6.55 µA and 0.0135 electron Volts (eV) for pristine samples, and 9.13 µA and 0.0188 eV for BTO/WO$_3$ co-added sample, respectively. I$_0$ and E$_j$ remained higher for BTO/WO$_3$ co-added sample with increased H$_{AC}$. The increase indicated better coupling among the grains and hence, stronger Josephson junctions. As a result, tunneling of Josephson currents was facilitated across grain boundaries even at high fields. The result might be understood by the presence of BTO and WO$_3$ nanoparticles at grain boundaries playing the role of bridges that linked the superconducting grains and fill the pores, resulting in better homogeneity.

TABLE 2

The different important parameters deduced from AC susceptibility analysis for pristine and BTO/WO$_3$ co-added YBCO samples.

| H$_{ac}$ (Oe) | Pristine YBCO sample | | | | | | BTO/WO$_3$ co-added YBCO sample | | | | | |
|---|---|---|---|---|---|---|---|---|---|---|---|---|
| | T$_c$ (K) | T$_{cj}$ (K) | T$_{cg}$ (K) | T$_{cp}$ (K) | I$_0$ (µV) | E$_j$ (eV) | T$_c$ (K) | T$_{cj}$ (K) | T$_{cg}$ (K) | T$_{cp}$ (K) | I$_0$ (µV) | E$_j$ (eV) |
| 2 | 86.19 | 68.41 | 86.17 | 67.77 | 6.55 | 0.0135 | 89.93 | 76.02 | 90.53 | 79.55 | 9.13 | 0.0188 |
| 4 | 86.03 | 63.33 | 85.75 | 62.5 | 5.12 | 0.0105 | 89.75 | 70.2 | 90.19 | 76.52 | 6.46 | 0.0082 |
| 7 | 85.71 | 56.34 | 85.11 | 55.14 | 3.92 | 0.0081 | 89.58 | 63.22 | 89.98 | 72.33 | 4.78 | 0.0098 |
| 10 | 85.39 | 51.37 | 84.81 | 48.79 | 3.36 | 0.0069 | 89.4 | 56.46 | 89.61 | 68.5 | 3.81 | 0.0078 |

Figure 11A:
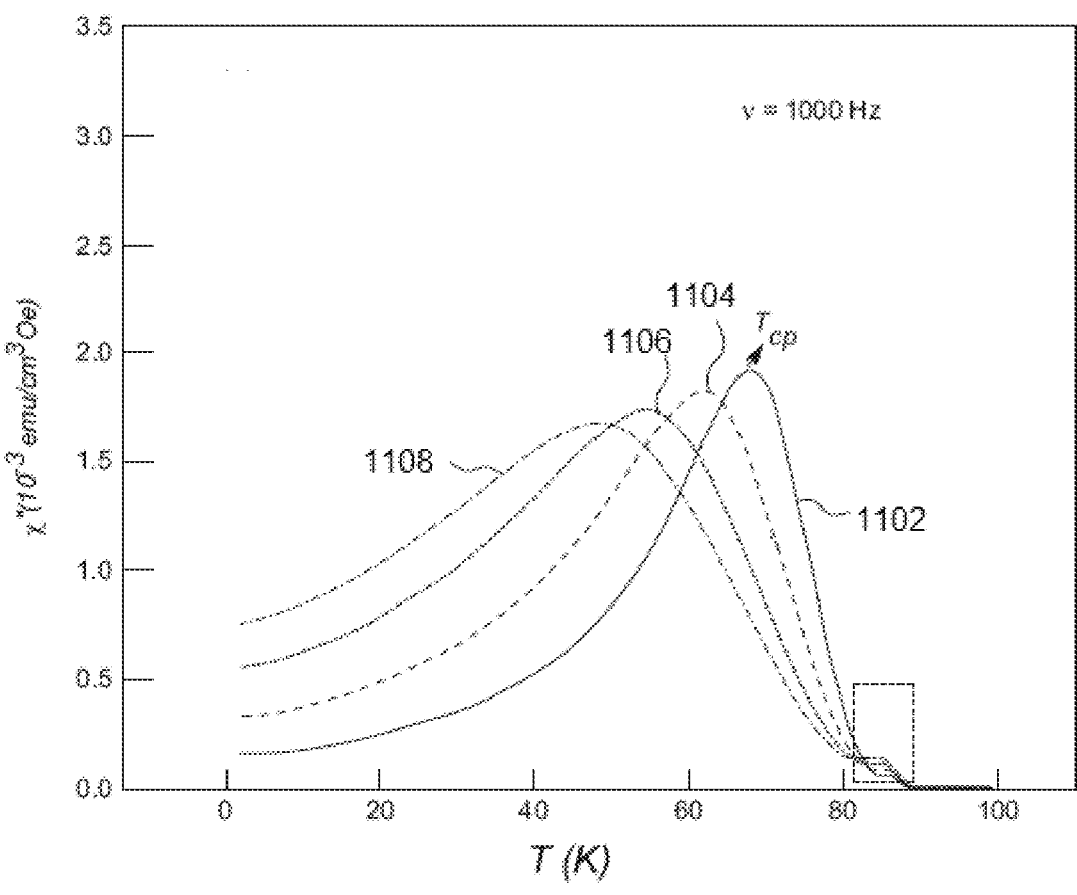
FIG. 11A illustrates variations of the second part of AC susceptibility $\chi''$ curves versus temperature ($\chi''$-T) of the pristine samples at different $H_{AC}$ of 2, 4, 7, 10 Oe.
Figure 11B:
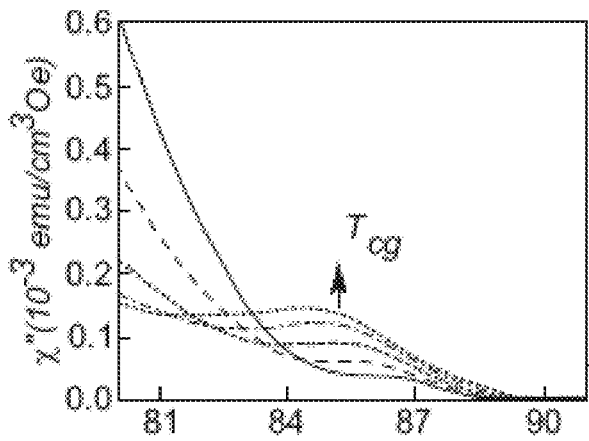
FIG. 11B shows an enlarged view of ($\chi''$-T) near the onset transition, according to certain embodiments.
Figure 11C:
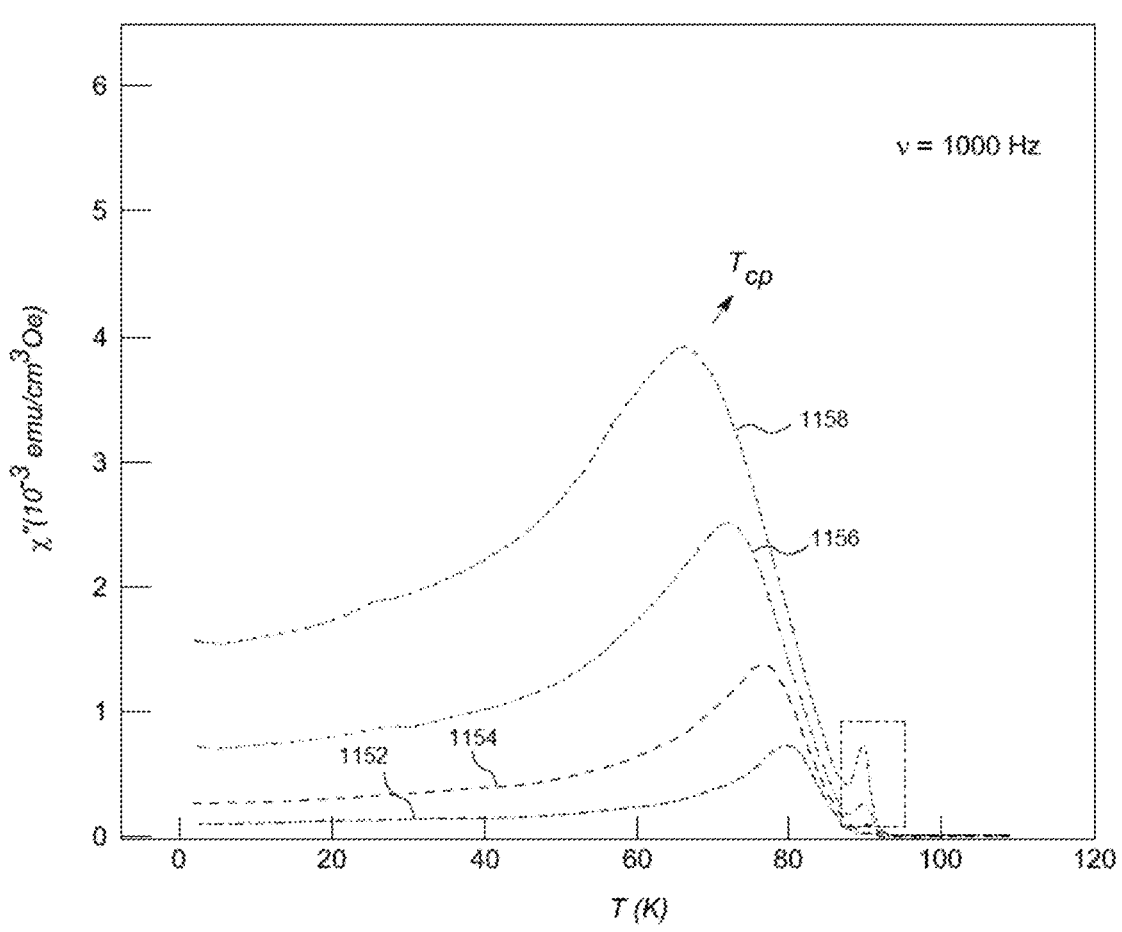
FIG. 11C illustrates variations of the second part of AC susceptibility $\chi''$ curves versus temperature ($\chi''$-T) of BTO/$WO_3$ co-added YBCO samples at different $H_{AC}$ of 2, 4, 7, 10 Oe.
Figure 11D:
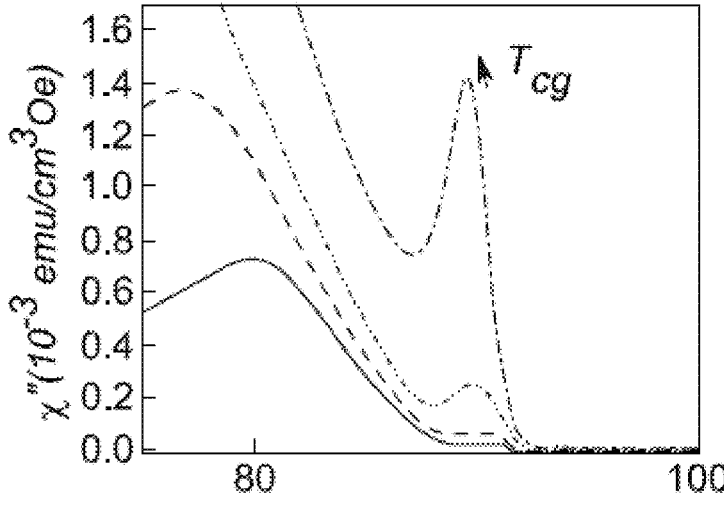
FIG. 11D shows an enlarged view of ($\chi''$-T) near the onset transition, according to certain embodiments.
Figure 12:
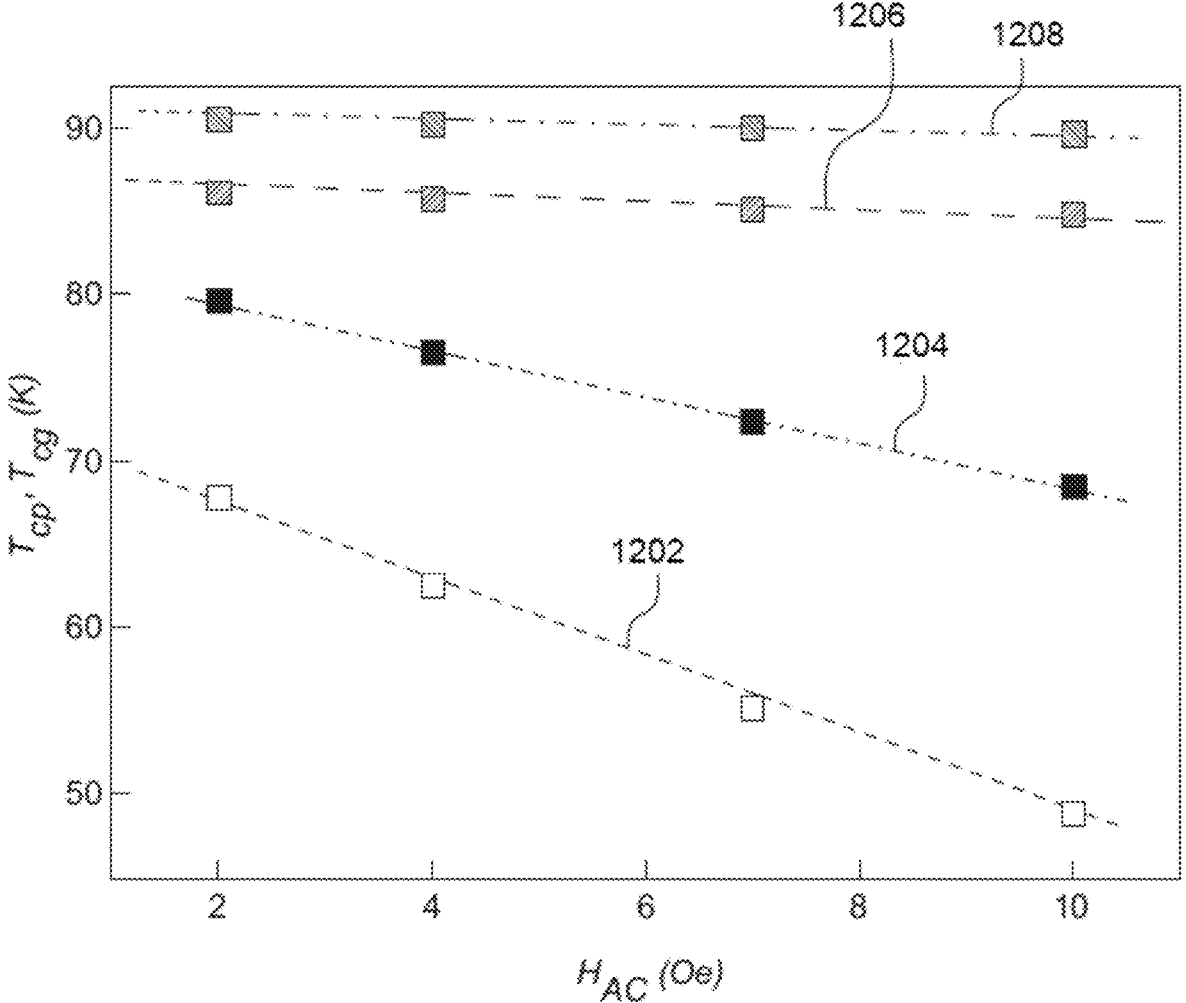
FIG. 12 illustrates an evolution of $T_{cp}$ and $T_{cg}$ with $H_{AC}$ for the pristine and BTO/$WO_3$ co-added samples. The shifting of $T_{cp}$ with $H_{AC}$ is faster for the pristine sample as compared to the BTO/$WO_3$ co-added YBCO sample, according to certain embodiments.
Figure 13:
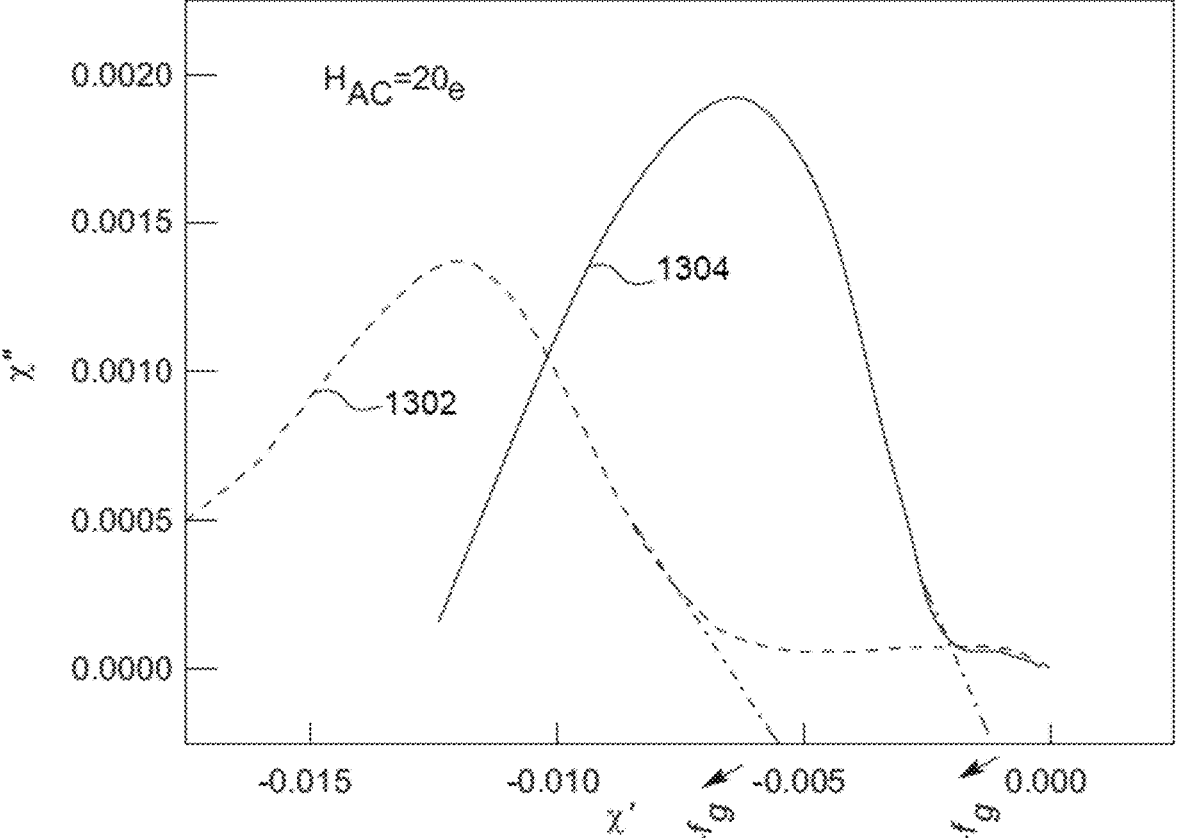
FIG. 13 illustrates a Cole-Cole plot ($\chi''$ versus $\chi'$) of the pristine and BTO/$WO_3$ co-added YBCO samples at $H_{AC}$=2 Oe and v=1000 Hertz (Hz), according to certain embodiments.
Figure 14:
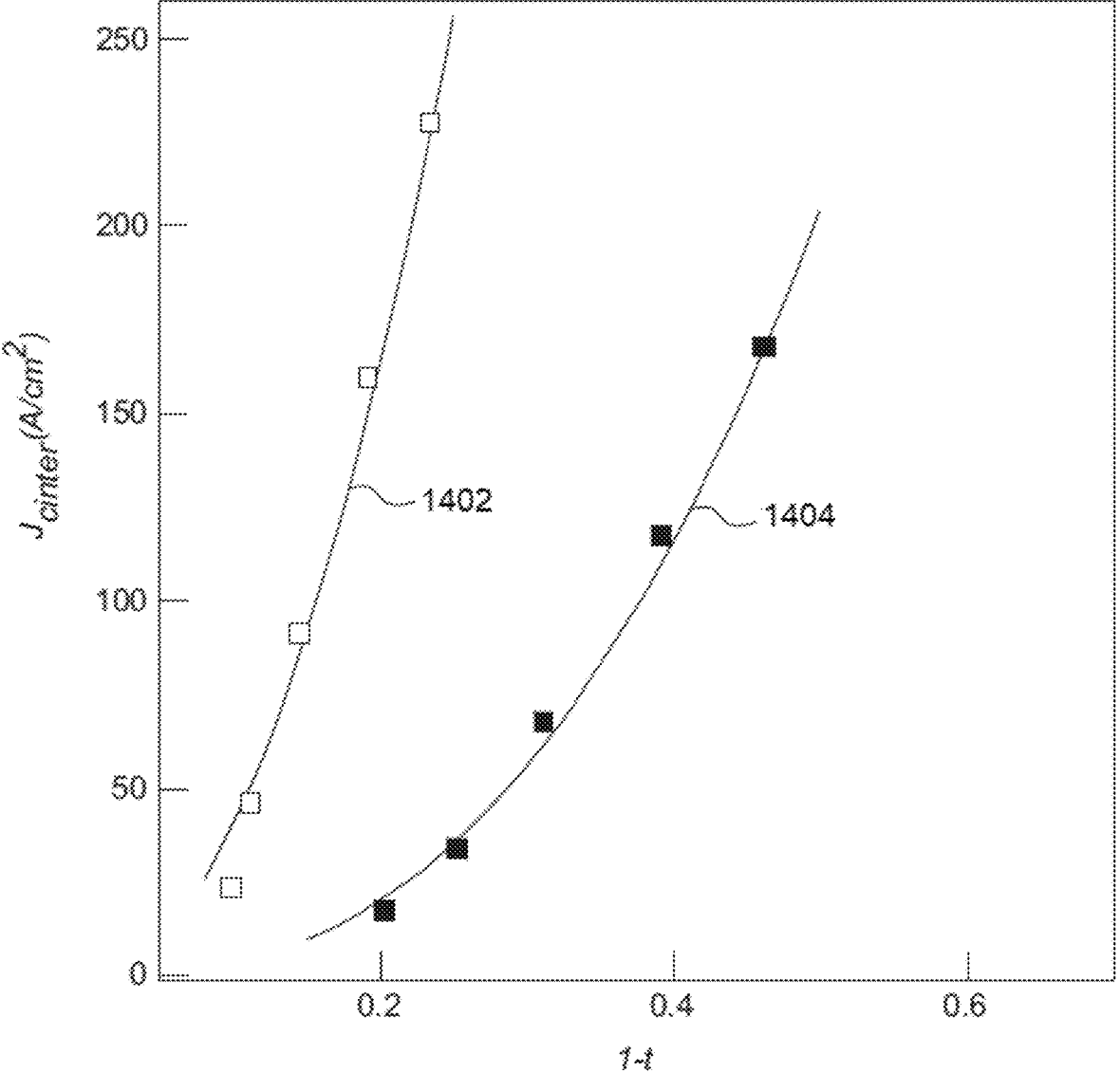
FIG. 14 illustrates variations of $J_{cinter}$ with the reduced temperature (1–t) where t=$T_{pc}/T_c$. The continuous black lines are the fitting results of $J_{cinter}$ curves using the equation $J_{cinter}(T)=J_{cinter}(0) (1-t)^\alpha$ for pristine and BTO/$WO_3$ co-added samples, according to certain embodiments.

FIGS. 11A-11B illustrate the plots of $\chi''$, the imaginary part ($\chi''$) has a bell shape and presents two peaks. The small peak in the higher temperature region was close to T$_c$, which corresponded to the T$_{cg}$ intrinsic peak's behavior of intragrain. The small peak might be attributed to the loss effect owing to intragranular Abrikosov vortices motion in the grains. T$_{cg}$ varies from 86.17 to 84.81±0.1 K for the pristine sample and from 90.53 to 89.61±0.1 K for the BTO/WO$_3$ co-added YBCO sample. The plot of FIG. 11A shows H$_{AC}$ of 2 Oe 1102, 4 Oe 1104, 7 Oe 1106, and 10 Oe 1108 for pristine YBCO. The plot of FIG. 11B shows H$_{AC}$ of 2 Oe 1152, 4 Oe 1154, 7 Oe 1156, and 10 Oe 1158 for pristine YBCO. The decay of $T_{cg}$ with $H_{AC}$ is lesser in BTO/WO$_3$ co-added YBCO sample. This implied that the combined introduction of BTO and WO$_3$ nanoparticles improve the intragranular pinning force for Abrikosov vortices. For the lower temperature region, a broad loss peak at coupling temperature $T_{cp}$ has appeared. The $T_{cp}$ peak was ascribed to inter-grain coupling in the material and reflects the full penetration field into the material. $T_{cp}$ peak of both samples exhibited shifting toward lower temperatures. $T_{cp}$ varied from 67.77 to 48.79±0.1 K for the pristine sample and from 79.55 to 68.50±0.1 K for BTO/WO$_3$ co-added sample. FIG. 12 illustrates the shifting of Top with $H_{AC}$ is faster for the pristine sample (1202 and 1206) as compared to the BTO/WO$_3$ co-added YBCO sample. This means better inter-grain coupling with the combined addition of BTO and WO$_3$ nanoparticles to the YBCO phase. Indeed, the amount of shifting to lower temperature as $H_{AC}$ increased was proportional to the strength of the pinning force. The great the shift of $T_{cp}$, the weaker pinning force, and hence the lesser intergranular critical current density. The plot of $T_{cg}$ for the co-added sample (1204 and 1208). FIG. 13 illustrates the Cole-Cole plots ($\chi''$ versus $\chi'$) of the pristine 1204 and BTO/WO$_3$ co-added sample 1302 at $H_{AC}$=2 Oe and v=1000 Hz. The Cole-Cole plots showed dome-shaped curves for both samples. By plotting Cole-Cole $\chi''(\chi')$, the volume fraction of grains, $f_g$, might be deduced, which may be used to obtain a quantitative analysis of the grains and matrix contributions. The volume fraction of grains, $f_g$, for each sample was estimated from the extrapolated onset (indicated by arrows in FIG. 13). The values of $f_g$ were found to be 0.0045±0.002 and 0.0020±0.002 for pristine and BTO/WO$_3$ co-added samples, respectively. The grain volume fraction $f_g$ increased with the combined addition of BTO and WO$_3$ nanoparticles, indicating a larger intra-granular contribution. The result was supported by SEM and DC magnetization analysis. Similar results were obtained previously in the case of YBCO added carbon nanotubes (CNTs) and Bi$_2$Sr2CaCu$_2$O$_{8+\delta}$ superconductor. The critical state model proposed by Bean was used to calculate the inter-granular critical current density $J_{cinter}$ at the coupling peak temperature, TP, of $\chi''$ using the equation 5:

$$J_{cinter}T_{pc}=H_{AC}/wl^{1/2} \quad (5)$$

Where 2 w×2 1 is the cross-section of the rectangular bar-shaped sample. FIG. 14 illustrates the variation of the deduced $J_{cinter}$ with the reduced temperature (1-t) where $t=T_{pc}/T_c$ for pristine 1404 and BTO/WO$_3$ co-added samples 1402. The temperature dependence of $J_{cinter}$ follows the power law as equation 6:

$$J_{cinter}(T)=J_{cinter}(0)(1-t)^\alpha \quad (6)$$

$J_{cinter}(0)$ is the critical current density flowing across the Josephson junctions at T=0K, and the power lower exponent n is an indicator of the natural character of the inter-granular junctions. Generally, a can take the value of 1 (for superconductor-insulator-superconductor (SIS) junction) or 2 (for superconductor-normal metal-superconductor (SNMS) junction. $J_{cinter}(0)$ and n were adjustable parameters obtained from the best fitting of the experimental data (shown in FIG. 14) with equation 6. The value of $J_{cinter}(0)$ increased from 1.18 kiloamperes per square centimeter (kA/cm$^2$) for pristine sample to 5.10 kA/cm$^2$ for BTO/WO$_3$ co-added sample. The value was higher than obtained in YBCO sample added with only WO$_3$ nanoparticles. The exponent a was found to be equal to 2.52 and 2.14 for pristine and BTO/WO$_3$ co-added YBCO samples, respectively. Therefore, the weak links behaved as SNMS nature in both prepared samples. The improvement of $J_{cinter}$ provides a clue support to SEM results as BTO and WO$_3$ nanoparticles were seen as adhering to the grain boundaries playing the role of catalysts that increase the grain connectivity and fill up the voids and pores. Such morphological features demonstrated the improvement of the inter-granular coupling of YBCO material.

Example 9: Electrical Measurements

Figure 15:
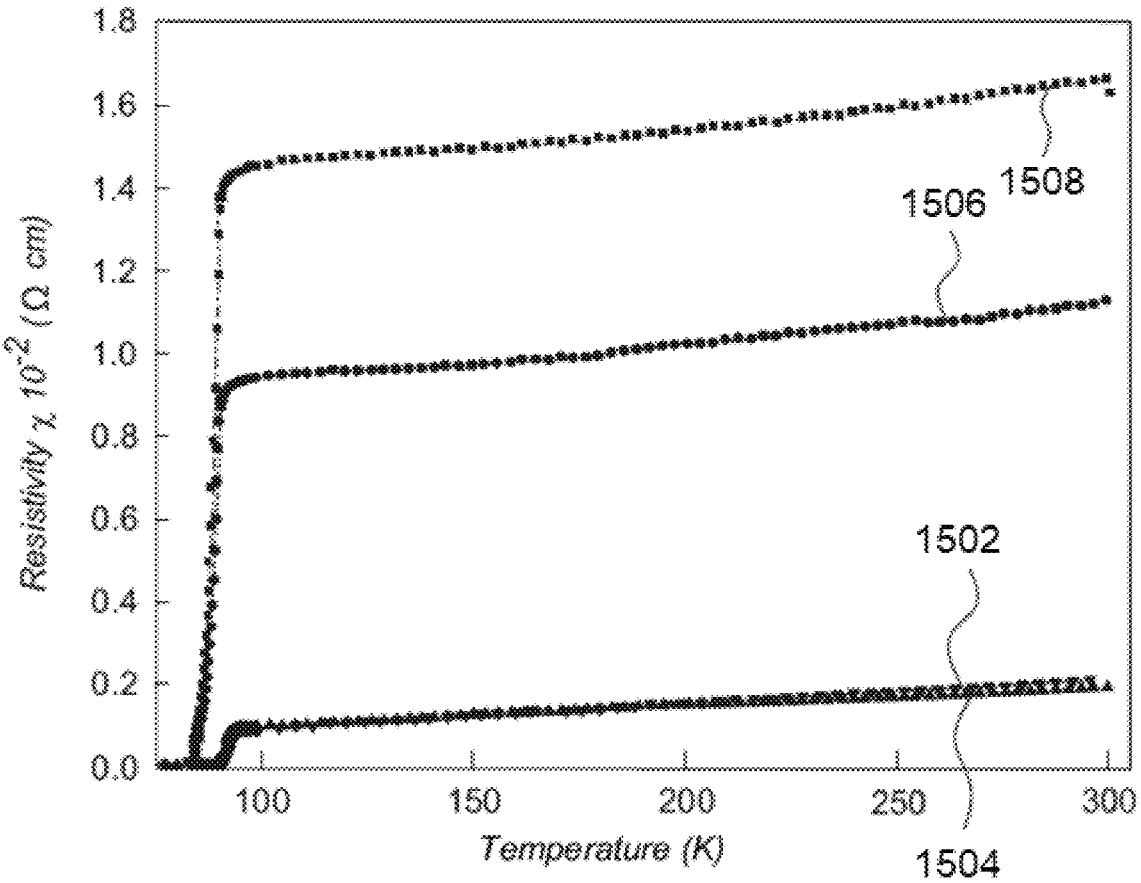
FIG. 15 illustrates the temperature dependence of electrical resistivity ($\rho$-T) for different sintered samples, according to certain embodiments.
Figure 16:
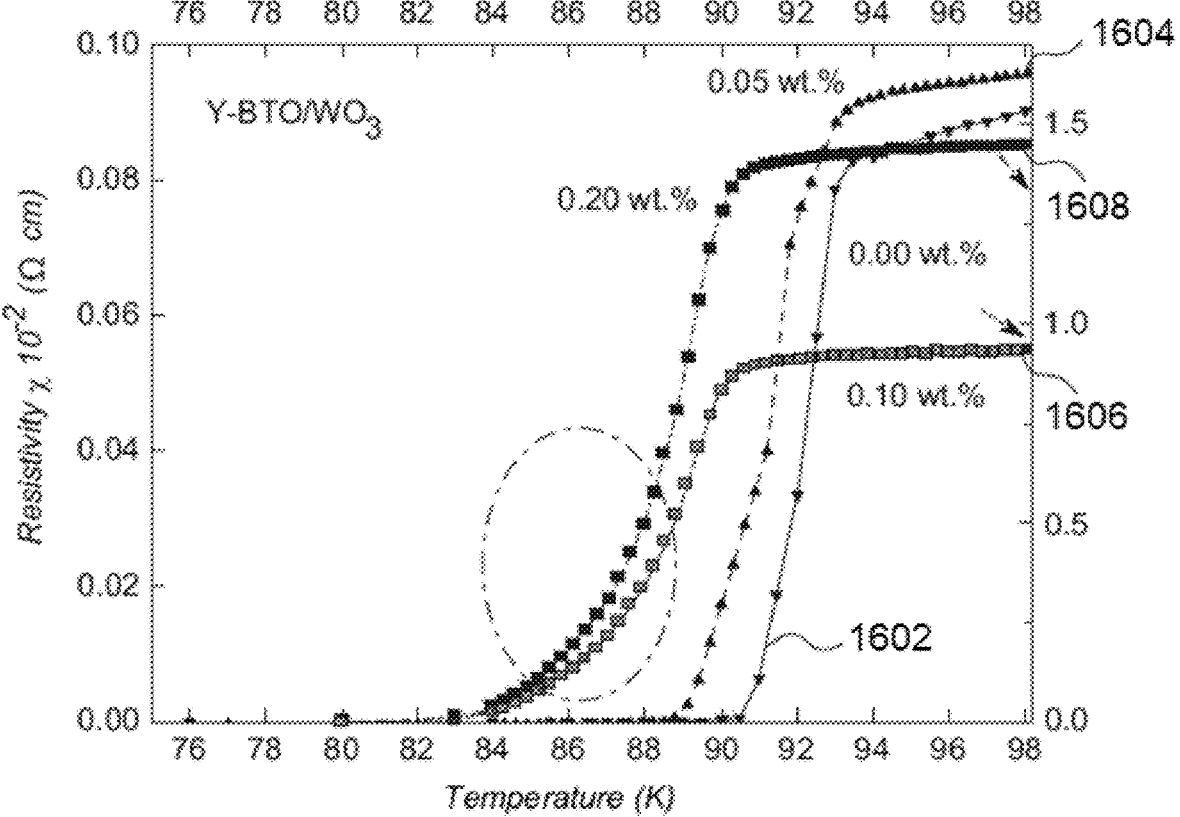
FIG. 16 illustrates an enlarged view of $\rho$-T curves for different sintered samples, according to certain embodiments.

FIG. 15 illustrates measurements of the electrical resistivity as a function of temperature for different samples with various amounts of BTO-WO$_3$ nanoparticles. All samples show a superconducting transition to zero resistivity at $T_{co}$. The plot shows 0.00 wt. % 1502, 0.05 wt. % 1504, 0.10 wt. % 1506 and 0.10 wt. % 1508. The pure and 0.05 wt. % co-added samples display metallic behavior in the normal state (dρ/dT>0) and at higher temperatures, the samples exhibited linear temperature dependence following Anderson and Zou relation $\rho_n$ (T) A+BT. With further increase in the concentration of additives, the resistive curve tends to the metal-insulator transition. The room temperature resistivity $\rho_n$, and the transition temperature $T_{co}$ values of all the samples are listed in Table 3. The sample added with 0.05 wt. % of BTO-WO$_3$ nanoparticles exhibited the lowest value of $\rho_n$. The lowest value implied that the sample with x=0.05 wt. % displayed the best grain conductivity. Then, $\rho_n$ increased with further increase of BTO-WO$_3$ nanoparticles content. The $\rho_n$ increment resulted from an increase of the disorder degree in the co-added samples. From Table 3, it follows that $T_{co}$ shows a notable drop with BTO-WO$_3$ nanoparticles addition from 89.65 K with w 0.05 wt. % to 80.83 and 80.05 K for x=0.1 wt. % and 0.2 wt. %, respectively. The reduction of $T_{co}$ was related to oxygen content change in YBCO upon BTO-WO$_3$ nanoparticles co-addition. Another plausible reason for the brutal reduction was the presence of inhomogeneities due to BTO/WO$_3$ nanoparticles co-addition in intergranular regions. This also confirms that Cu atoms in YBCO crystals lattice were partially substituted. On the other hand, the superconducting transition temperature, $T_c$ onset, was almost unchanged with x=0.05 wt. % (~93 K) but it decreases for samples with x=0.10, 0.20 wt. %. Indeed, different factors might influence the ρ-T characteristics, chief among them the mesoscopic inhomogeneities including voids, cracks, grain boundaries, etc. that have a much greater length scale than the superconducting coherence length ξ and were dominant in the region where zero resistivity state was approached, and microscopic inhomogeneities such as structural (stacking faults, twin boundaries) and chemical imperfections (oxygen deficiencies, etc.) within the grains arise in a length scale smaller than the mesoscopic inhomogeneities, but still greater than ξ. FIG. 16 illustrates more details of the superconducting transition behavior of samples with x=0.00 1602, 0.05 1604, 0.10 1606, and 0.20 1608 wt. % might be extracted from the enlarged view of ρ-T curves. In this graph, the left and bottom axis were belonging to the plots of ρ-T of the samples with 0.00, 0.05 wt. %, while the right and top axis were belonging to the plots of ρ-T of the samples with x-0.10 and 0.20 wt. %. Sharp superconducting transition is seen for pure and 0.05 wt. % BTO-WO$_3$ added samples. However, the width of the superconducting transition widens with a further increase of BTO-WO$_3$ content followed by the appearance of a tail at the lower end of the superconducting transition as indicated by the hallow red circle in the figure. Such tail has been also observed in the case of YBCO doped with different amounts of BTO. The appearance of the tail as it neared transition to a state of superconducting revealed that the superconducting grains gradually pair with each other via the Josephson tunnel through the weak bonds of the grain boundaries. Near $T_{co}$, the electrical resistivity might be fitted according to the following power law as equation 10:

$$\rho = At^{\gamma} \qquad (10)$$

where $t^{\gamma}$ is the reduced temperature $$\left(t = \left(\frac{T}{T_{co}} - 1\right)\right),$$

and $\gamma$ is the transport critical exponent.

Figure 17:
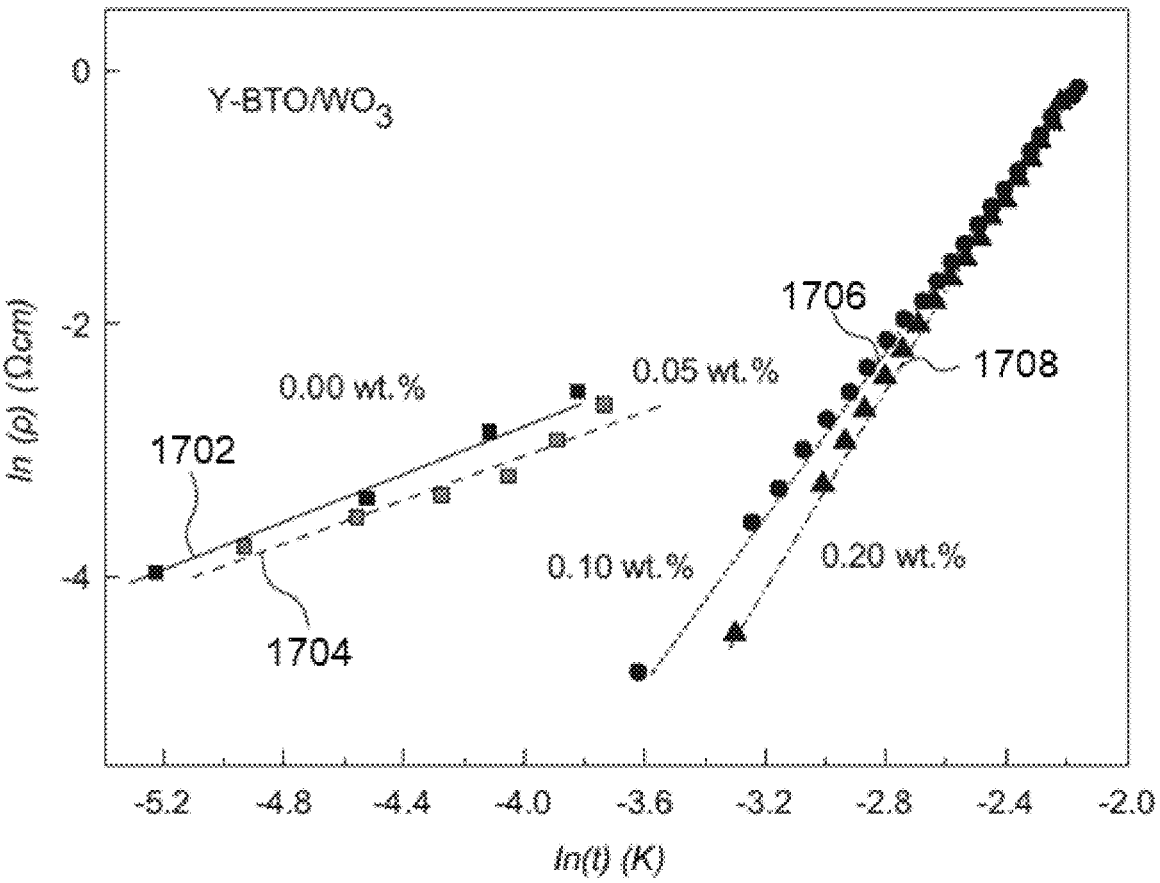
FIG. 17 illustrates a logarithmic plot of electrical resistivity as a function of reduced temperature for different samples, according to certain embodiments.
Figures 18A, 18B:
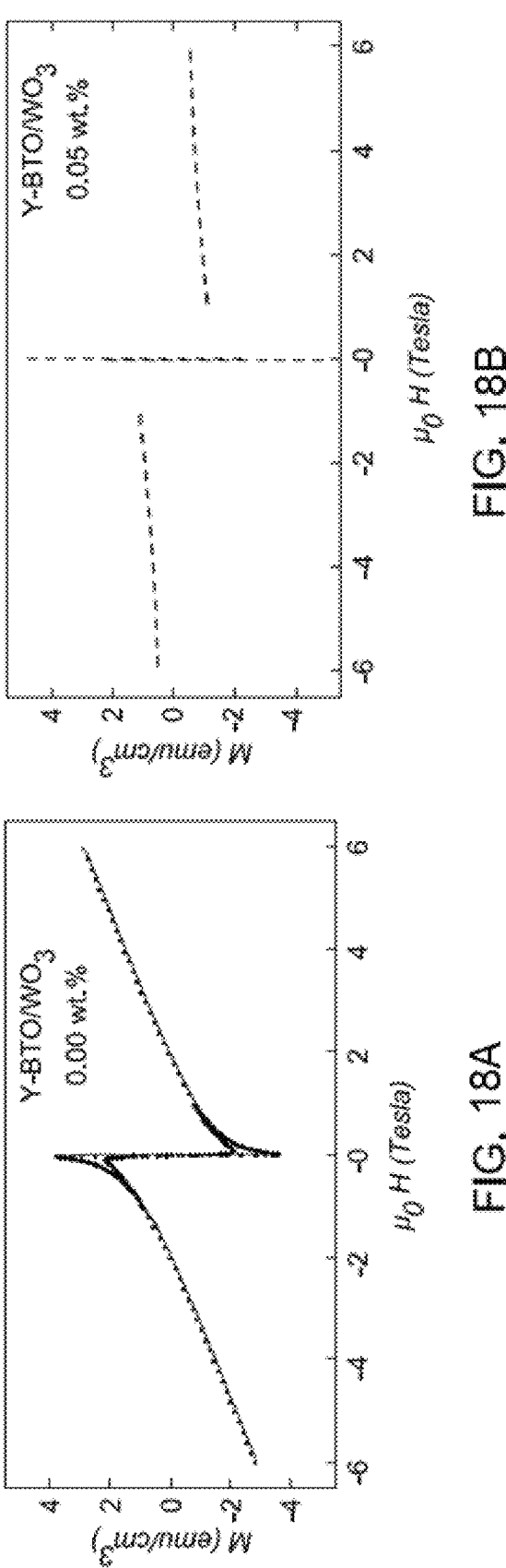
FIGS. 18A-18D illustrate a hysteresis loop M($\mu_0$H) for different sintered samples performed at T 77 K, according to certain embodiments.
Figures 18C, 18D:
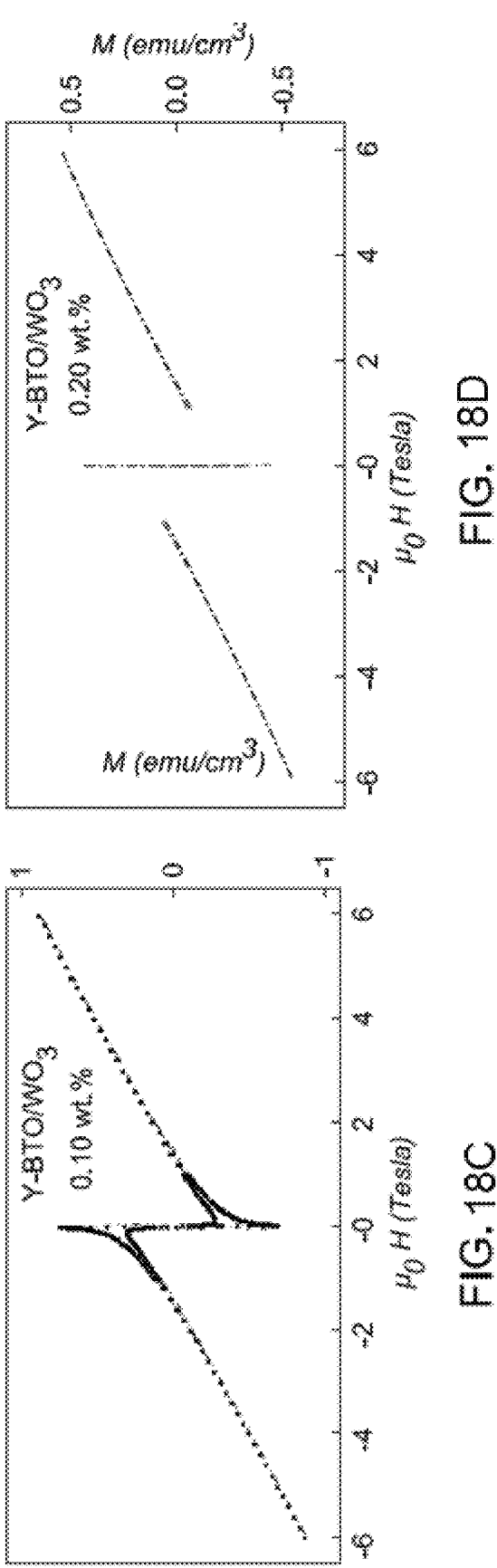

FIG. 17 illustrates the fitting of the experimental data with equation 10 that give the values of the exponent $\gamma$ that are equal to 1.02, 0.9, 3.17, and 3.76 for samples added with 0.0 1702, 0.05 1704, 0.10 1706, and 0.20 1708 wt. % BTO-WO$_3$, respectively. A value of ~1.33 for the YBCO samples was obtained doped with BTO, in concordance with percolation theory. According to this theory, the power-law behavior might be due to the superconducting fluctuations via the inter-grain junctions. The values of $\gamma$ obtained for pure and 0.05 wt. % BTO/WO$_3$ added samples were near to those obtained. However, when exceeding 0.05 wt. %, the value of $\gamma$ greatly increases. The $\gamma$ increment was mostly attributed to the dominance of mesoscopic inhomogeneities due to the high level of BTO/ WO$_3$ included inside YBCO material.

Example 10: DC Magnetization Measurements

FIGS. 18A-18D illustrate the relevant effect of the combination of BTO and WO$_3$ nanoparticles on the pinning properties of YBCO, DC magnetization measurements were performed at a temperature of 77 K under an applied magnetic field ranging between −6 T and 6 T. The plot shows samples added with 0.0 (FIG. 18A), 0.05 (FIG. 18B), 0.10 (FIG. 18C), and 0.20 wt. % (FIG. 18D) BTO-WO$_3$, respectively. It is evident from FIGS. 18A-18D that the magnetization has a peak at Hel beyond which the flux penetrates, and magnetization begins to decrease progressively. Among the differently prepared samples, the decay in magnetization was lower for 0.05 wt. % co-added BTO/WO$_3$ sample in the entire range of considered magnetic field. The flux lines (vortices) have been treated in a mixed state of superconductor type II as defined elastic objects that might be trapped due to various structural irregularities, e.g., impurities, tains efficient structural defects that contribute to impeding the motion of vortices and hence enhancing J$_c$ values. The critical current density Jc of the different samples was calculated from the width of the M-H loops using the Bean model expression (equation 1).

Figure 19A:
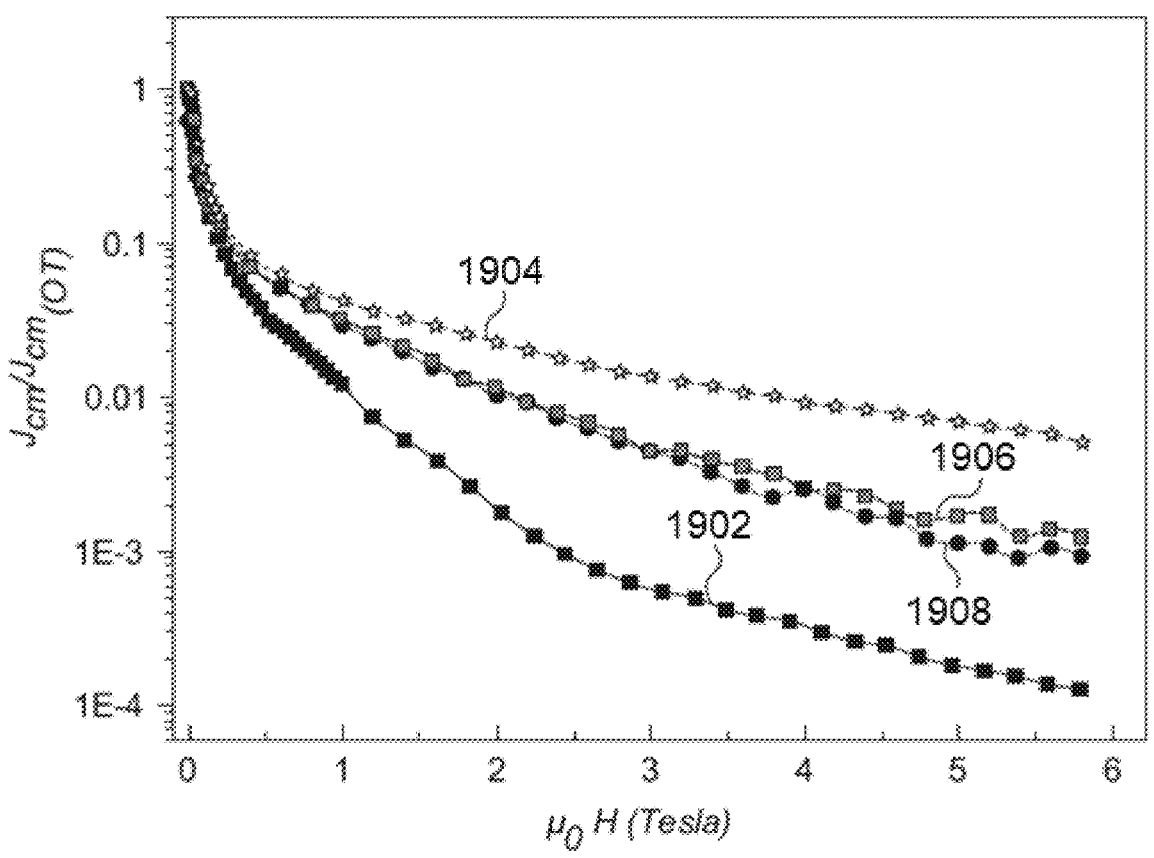
FIG. 19A illustrates the variations of a normalized critical current density for different sintered samples at T=77 K.
Figure 19B:
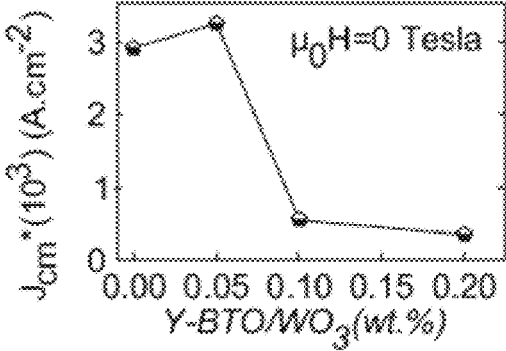
FIG. 19B shows the evolution of the value of self-field $J_{cm}$ with the concentration of BTO/$WO_3$ co-dopants, according to certain embodiments.

FIG. 19A shows the normalized J$_c$ plots versus magnetic field at 77 K for pure YBCO sample and BTO/WO$_3$ co-added YBCO samples. The self-field J$_c$ variations with BTO/WO$_3$ wt. % are illustrated in FIG. 19B and their values are listed in Table.4. The plot shows samples added with 0.0 2002, 0.05 2004, 0.10 2006, and 0.20 wt. % 2008 BTO-WO$_3$, respectively. The self-field J$_c$ increased first with 0.05 wt. % and then decreased considerably with a further increase in the amount of BTO and WO$_3$ nanoparticles. The result could be linked to the increased volume of BTO/WO$_3$ nanoparticles and distorted YBCO surroundings with lower $T_c$, which together decrease the amount of superconducting material. The decrease in self-field J$_c$ for concentration beyond x0.05 wt. % indicates a poor pinning property in these samples (i.e., x 0.1 and 0.2 wt. %) which might be due to high defects density or the resulting defects having a size greater than the coherence length $\xi$. For defects to work as effective pinning centers, their size must be of the order of $\xi$. Even defects of smaller size than $\xi$ were considered as poor pinning centers because their effect is medium over a large volume. Meanwhile, in the presence of applied fields and above accommodation field B*, all samples added with different amounts of BTO and WO$_3$ nanoparticles show an improved J$_c$ value and more slowly decrease with magnetic field magnitude compared to non-added one. The accommodation field (B*) was defined as the field at which the J$_c$ was 90% of the self-field J$_c$. The B* values for different samples listed in Table 4 show that the single vortex pinning region is improved by the combined addition of BTO/WO$_3$ nanoparticles from the initial 15.3 mT in the pure sample to 28.5 and 21 mT in the x 0.05, and 0.1 added samples, respectively. However, the YBCO sample added with 0.2 wt. % showed a lower B* compared to the pure one. The fact that the single vortex pinning regime was low in this sample was a plausible consequence of the emergence of ineffective defects possibly caused by the agglomeration of BTO nano-phases in the YBCO matrix. Isabel Van Driessche's group calculated the accommodation field of the BTO added to YBCO film and showed no enhancement in B* value compared to the pristine film. The authors attribute the result to the big agglomerations of BTO without individual nanoparticles, large Y124 impurities on the surface of the YBCO film, and highly coherent twin boundaries.

TABLE 4

Figure 20:
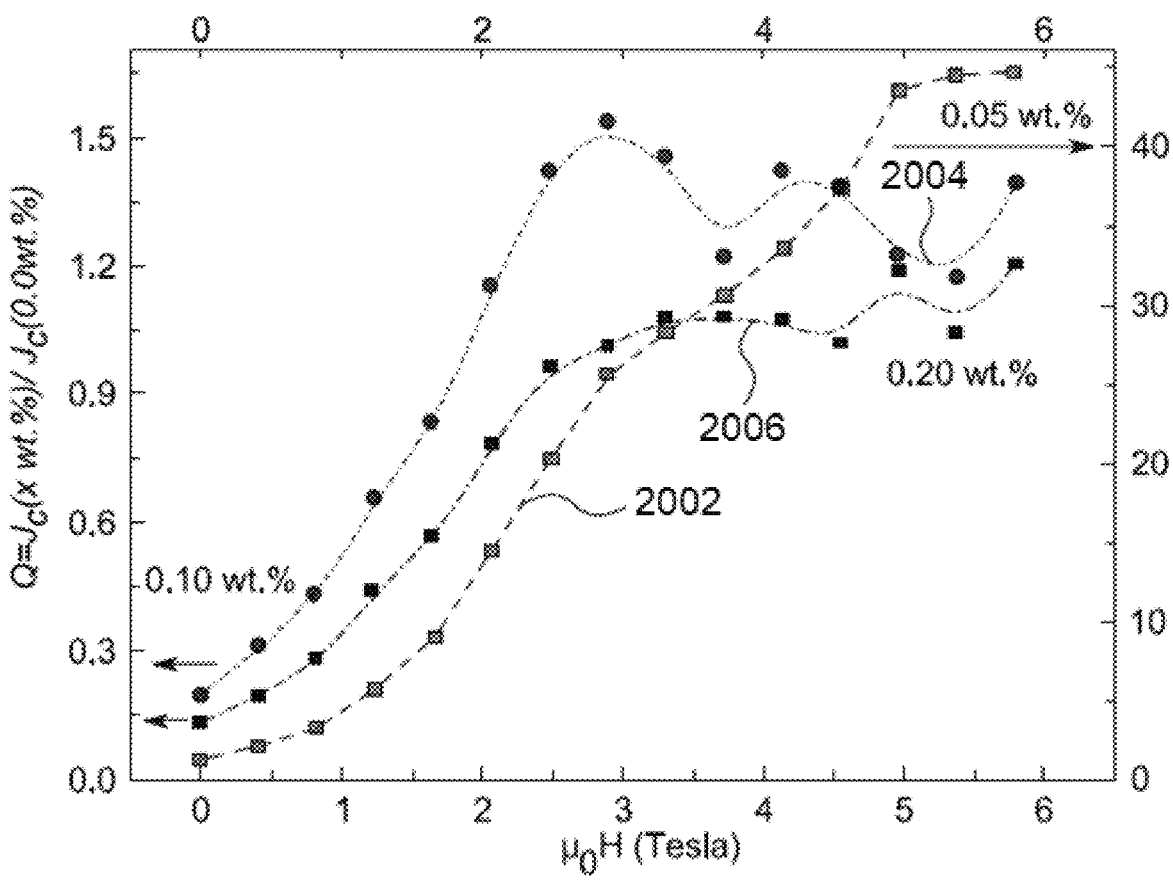
FIG. 20 illustrates the variations of quotient Q-$J_c$(x wt. %))/$J_c$(x 0.00 wt. %) versus the applied magnetic field for different sintered samples, according to certain embodiments.
Figure 21:
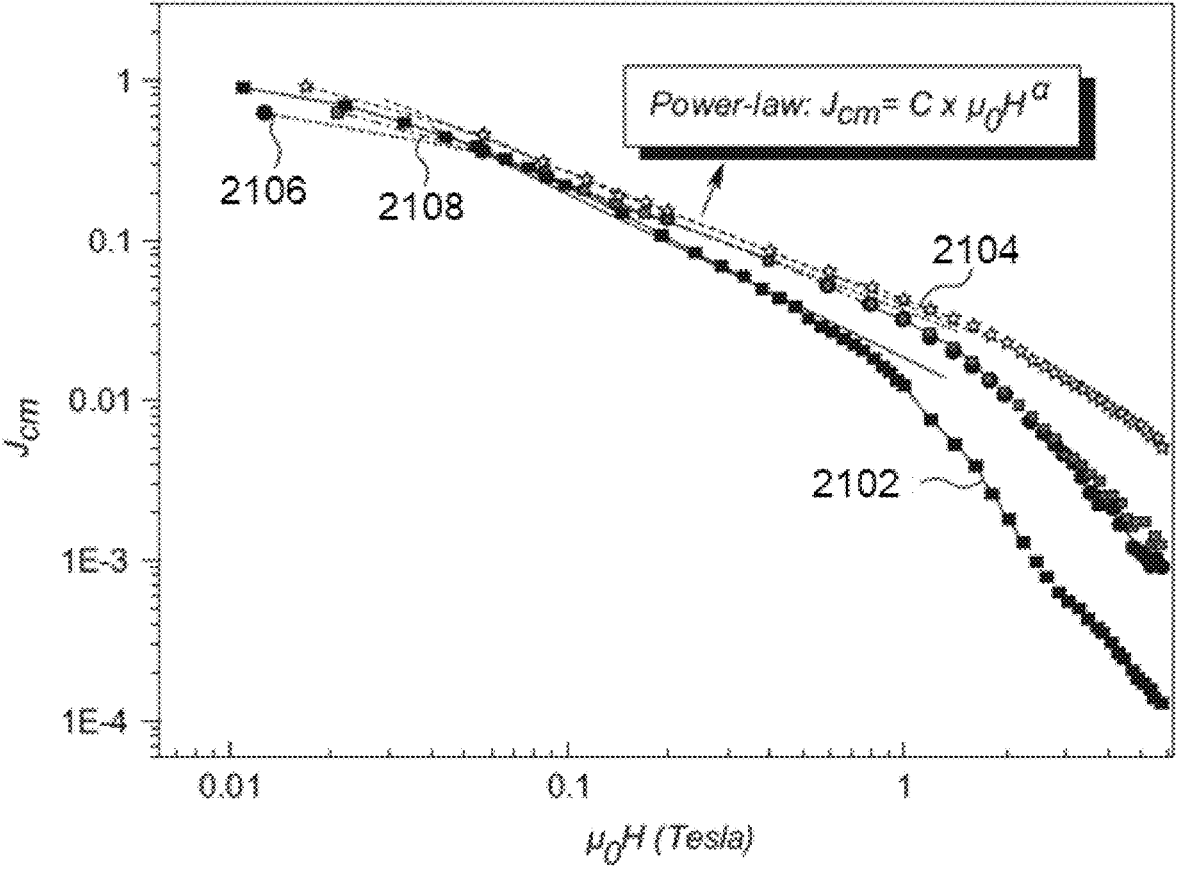
FIG. 21 illustrates the plots of $J_{cm}$ vs. $\mu_0$H in a logarithmic scale for different sintered samples (scatter). The solid lines are the data fitted by the power law $J_{cm} C\times(\mu_0H)^\alpha$, according to certain embodiments.

| | The superconducting parameters extracted from electrical and DC magnetization Measurements | | | | | |
|---|---|---|---|---|---|---|
| Compositions | Superconducting parameters | | | | | |
| Y-BTO/WO$_3$ (wt. %) | $T_{co}$ (K) ± 0.1 | $T_c^{onset}$ (K) ± 0.1 | $\rho_n$ (cm) × $10^{-2}$ | $J_C(0)$ (A/cm$^2$) × $10^4$ | B* (mT) | $\alpha$ |
| 0 | 91.01 | 93 | 0.21 | 0.29 | 15.3 | 0.98 |
| 0.05 | 89.65 | 92.32 | 0.19 | 0.326 | 28.5 | 0.79 |
| 0.1 | 80.83 | 90.86 | 1.13 | 0.059 | 21 | 0.84 |
| 0.2 | 80.05 9 | 0.83 | 1.66 | 0.037 | 10 | 0.92 | strains, dislocations, or other physical defects. The mixed state resulted in irreversibility in magnetization hysteresis loops. The slow decay in magnetization for 0.05 wt. % co-added BTO/WO$_3$ sample indicated that the sample con- FIG. 20 displays the variations of the quotient Q=J$_c$(x wt. %))/J$_c$(x 0.00 wt. %) versus the applied magnetic field. The plot shows 0.05 wt. %, 2002, 0.10 wt. % 2004 and 0.20 wt. % 2006. It was apparent that the sample was added by 0.05 wt. % BTO and WO$_3$ nanoparticles showed better performance than either the 0.1 wt. % or 0.2 wt. % added samples. In the entire applied magnetic field, the critical current density for x 0.05 wt. % continuously increased, and the factor boost might reach up to 45 under high magnetic field amplitudes. The high magnetic field result confirmed that the suitable amount (i.e. 0.05 wt. %) of BTO and WO$_3$ nanoparticles added to the YBCO matrix results in the formation of efficient strong pinning sites that were able to pin a greater number of vortices. In the intermediate magnetic field ranging between B* and 1 T, the critical current density obeys the power law as equation 11:

$$J_{cm} = C \times (\mu_0 H)^\alpha \qquad (11)$$

where $\alpha$ is the exponent obtained by fitting the so-called collective vortex pinning region of the J$_c$ plot at 77 K to equation 11 (FIG. 21). The plot shows samples added with 0.0 2102, 0.05 2104, 0.10 2106, and 0.20 wt. % 2108 BTO-WO$_3$, respectively. As shown in Table 4, the value of $\alpha$ shows a decrease from 0.98 in pure sample to 0.79 for 0.05 wt. % added sample. This coincides with a slower decrease of J$_c$ with the magnetic field. The result might be attributed to the formation of crystal defects due to x 0.05 wt. % amount of BTO and WO$_3$ addition. These generated defects were acting as pinned centers that were responsible for better pinning properties.

Indeed, the introduction of different nanoparticles into YBCO led to significant changes in the microstructure, such as the size and the number of nanoparticles, strain fields around nanoparticles, planar defects caused by plastic deformation of the matrix near the nanoparticles, secondary phase particles, and twin boundary.

Figures 22A, 22B:
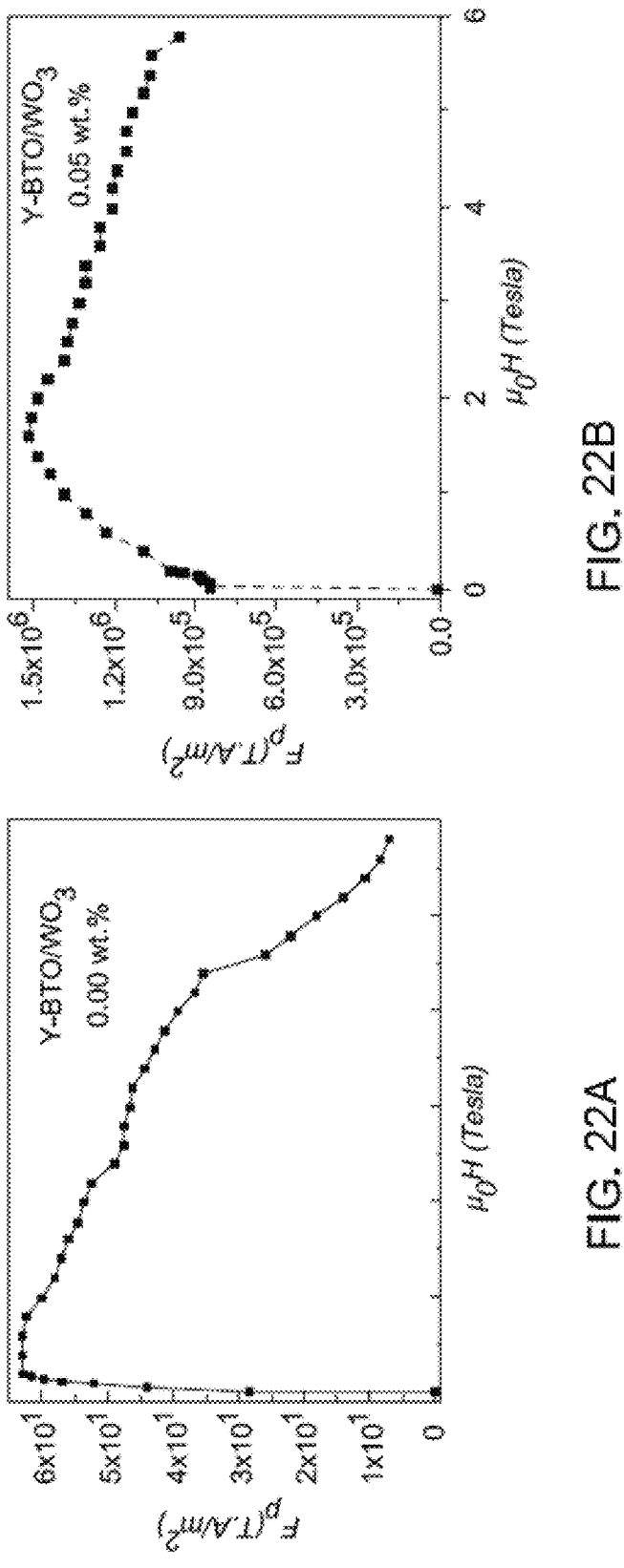

Full analysis of these differences was beyond the scope of the current work and will be the subject of future studies. However, to further investigate the impact of the combined addition of BTO/WO$_3$ nanoparticles on the flux pinning properties of YBCO, the pinning force density Fp $\mu_0 H \times J_c$ is calculated for both pure and BTO/WO$_3$ added samples. FIGS. 22A-22D illustrate the variation of F$_p$ as a function of the applied magnetic field at 77 K by samples added with 0.0 (FIG. 22A), 0.05 (FIG. 22B), 0.10 (FIG. 22C), and 0.20 wt. % (FIG. 22D) BTO-WO$_3$, respectively. The plots reveal that the pinning force density increases noticeably upon the co-addition of BTO and WO$_3$ nanoparticles in YBCO over the whole range of the applied magnetic field. When the concentration of the added BTO/WO$_3$ nanoparticles were at the optimum level (x 0.05 wt. %) the shifting was maximum (FIG. 22B). The maximum shifting indicated that the irreversibility line of the BTO/WO$_3$ added samples moves toward higher fields if the BTO/WO$_3$ nanoparticles concentration is 0.05 wt. %. The attenuation of the pinning force density with the applied magnetic field was less rapid compared to the YBCO added only with either WO$_3$ nanoparticles or BTO nanoparticles. By referring to the previous studies, BTO nanoparticles were shown to remain outside the grain and may act as a catalyst to enhance the quality of structure at the grain boundaries. This, in turn, leads to a rise in the contact surface between the grains (reducing the resistivity between the grains) and in the increase of the number of pinning. While WO$_3$ nanoparticles were observed to be embedded at YBCO grains and segregate at the grain boundaries. Hence, the combined addition of BTO and WO$_3$ into YBCO was assumed to be more effective under high magnetic field.

In such a situation, nano-BTO and WO$_3$ particles might intensify the density of defects that act as artificially strong pinning centers. Above the optimum level (i.e., 0.05 wt. %)

the peak positions of F$_p$ shift toward lower fields. In the case of the 0.05 wt. % BTO/WO$_3$ added sample, the density of pinning force tenfold increased as compared to 0.1 and 0.2 wt. % added samples. These values of F$_p$ were higher than the values found in YBCO doped with 4% of BTO (0.97 meganewtons per square meters (MN/m$^2$) at 77 K). The values indicated that the best flux pinning was achieved by suitable content of BTO/WO$_3$ nanoparticles. Also, the domination of the pinning force over the Lorentz force was observed even at a high magnetic field up to 6 T in 0.05 wt. % BTO/WO$_3$ added sample, reflected by a wide variation in F$_p$ curve. The variation implied that there was more than one mechanism responsible for blocking the flux lines motion.

Pristine YBCO and BTO/WO$_3$ co-added YBCO samples were synthesized using the solid-state reaction route. Detailed analysis of DC magnetization and AC susceptibility studies were performed. SEM observations showed W-rich nanosized entities embedded within the grains and dispersion of both BTO and WO$_3$ nanoparticles as catalysts at the grain boundaries playing the role of bridges connecting the superconducting grains. The width of hysteresis loops was wider in WO$_3$/BTO co-added sample compared to the pristine sample. The enhancement in the intergranular properties with the combined addition of WO$_3$ and BTO was evident from AC susceptibility performed at various fields. From the real part of AC susceptibility, the maximum Josephson current and the Josephson energy coupling were determined and found to increase with WO$_3$/BTO co-addition. The loss peak T$_{cp}$ observed in the imaginary part of AC susceptibly displayed a slower shifting to lower temperatures with magnetic field in WO$_3$/BTO co-added sample compared to the pristine sample. The inter-granular critical current density J$_{cinter}$ was significantly improved with WO$_3$/BTO nanoparticles addition. All these results proved the important role of WO$_3$/BTO nanoparticles co-addition on the flux pinning strengthening in the YBCO superconductor.

The experiment combined the effect of nano-BTO/WO$_3$ particles as artificially pinning centers on the superconducting and flux pinning properties of the YBCO system. The samples were prepared via two sintering steps through the solid-state reaction technique. The pure YBCO sample crystallizes in an orthorhombic structure. The orthorhombicity is almost the same with 0.05 wt. % co-addition of nano-BTO/WO$_3$ particles. The orthorhombicity undergoes a decrease with further co-addition of nano-BTO/WO$_3$ particles followed by a decrease in the critical transition temperatures (T$_{co}$) and an increase in the normal resistivity.

A significant improvement in the value of the accommodation field (B*), the self-and in-field critical current density J$_c$ and the pinning force density F$_p$ for an optimum 0.05wt. % nano-BTO/WO$_3$ particles added YBCO samples, relative to pure YBCO was observed. The critical current density for x=0.05 wt. % continuously increases, and the factor boost can reach up to 45 when compared to the pure sample in the entire applied magnetic field. The introduction of nano-BTO/WO$_3$ particles into the YBCO matrix resulted in the formation of more core centers, which led to the increase in pinning force density reaching a maximum of 1.5×10$^6$ teraamperes per square meters (TA/m$^2$) at 77 K. These results suggested that the combined addition of nano-BTO/WO$_3$ particles bulk is a practicable solution to the pinning degradation.

The invention claimed is:

1. A superconducting material, comprising:

a rare-earth barium copper oxide (ReBCO) matrix; and 0.01 to 0.5 wt. %, WO$_3$ nanoparticles, based on a total weight of superconducting material; and 0.01 to 0.5 wt. % cubic barium titanate nanoparticles, based on a total weight of superconducting material.

2. The superconducting material of claim 1, wherein the ReBCO matrix is a yttrium barium copper oxide (YBCO) matrix.

3. The superconducting material of claim 2, wherein the YBCO matrix comprises $YBa_2Cu_3O_{7-\delta}$.

4. The superconducting material of claim 1, wherein the $WO_3$ nanoparticles have a mean particle size of 25 to 500 nm.

5. The superconducting material of claim 1, wherein the barium titanate nanoparticles have a mean particle size of 10 to 250 nm.

6. The superconducting material of claim 1, wherein the ReBCO matrix exists in the form of grains having a mean grain size of 1 to 25 μm by SEM.

7. The superconducting material of claim 1, wherein the ReBCO matrix has a mean crystallite size of 25 to 75 nm by PXRD.

8. The superconducting material of claim 1, wherein the $WO_3$ nanoparticles and barium titanate nanoparticles are disposed within voids between grain boundaries of the ReBCO matrix.

9. The superconducting material of claim 1, having an orthorhombicity factor of $5.0 \times 10^{-3}$ to $10.0 \times 10^{-3}$ by PXRD.

10. The superconducting material of claim 1, having a superconducting transition temperature of 65 to 90 K.

11. The superconducting material of claim 1, having a critical current density at zero applied magnetic field ($J_c(0)$) of $0.01 \sim 10^4$ to $0.50 \times 10^4$ A·cm$^{-2}$.

12. The superconducting material of claim 1, having a room temperature resistivity $\rho_n$ of $0.05 \times 10^{-2}$ to $1.75 \times 10^{-2}$ Ω·cm.

13. The superconducting material of claim 1, wherein the cubic barium titanate nanoparticles are crystallized in cubic structure with Pm3m group space (ICCD No. 96-150-7758).

14. A method of forming the superconducting material of claim 1, the method comprising:

mixing $WO_3$ nanoparticles, cubic barium titanate nanoparticles, and ReBCO particles to form a particulate mixture;

pressing the particulate mixture at a pressure of 500 to 1000 MPa to form a solid sample; and heating the solid sample at 800 to 1100° C. for 1 to 24 hours to form the superconducting material.

15. The method of claim 14, wherein the ReBCO particles are yttrium barium copper oxide (YBCO) particles.

16. The method of claim 15, wherein the YBCO particles comprise $YBa_2Cu_3O_{7-\delta}$.

17. The method of claim 14, wherein the ReBCO particles are prepared by calcining a precursor mixture comprising rare earth oxide particles, barium carbonate particles, and copper oxide particles at 800 to 1100° C. for 1 to 24 hours.

18. The method of claim 17, wherein the ReBCO particles are yttrium barium copper oxide (YBCO) particles and the rare earth oxide is yttrium oxide.

19. The method of claim 14, wherein the cubic barium titanate nanoparticles used in the method are crystallized in cubic structure with Pm3m group space (ICCD No. 96-150-7758).

* * * * *